(12) United States Patent
McJunkin

(10) Patent No.: US 6,837,507 B1
(45) Date of Patent: Jan. 4, 2005

(54) MODULAR SUSPENSION STRUT ASSEMBLY FOR BICYCLE PEDAL HEIGHT ADJUSTMENT

(76) Inventor: H. P. McJunkin, 401 Painted Spindle Ct., Wilmington, NC (US) 28405

( * ) Notice: Subject to any disclaimer, the term of this patent is extended or adjusted under 35 U.S.C. 154(b) by 0 days.

(21) Appl. No.: 10/114,443

(22) Filed: Apr. 3, 2002

Related U.S. Application Data

(63) Continuation-in-part of application No. 09/800,958, filed on Mar. 8, 2001, now abandoned.
(60) Provisional application No. 60/187,878, filed on Mar. 8, 2000.

(51) Int. Cl.[7] .............................................. B62K 25/08
(52) U.S. Cl. ...................................... 280/276; 280/284
(58) Field of Search ................................ 267/256, 120; 280/276, 277, 283, 281.1, 284, 285

(56) References Cited

U.S. PATENT DOCUMENTS

| | | |
|---|---|---|
| 461,191 A | 10/1891 | Latta |
| 578,326 A | 3/1897 | Fox |
| 584,944 A | 6/1897 | Little |

(List continued on next page.)

FOREIGN PATENT DOCUMENTS

JP    8-169378    * 7/1996 ........... B62K/21/22

*Primary Examiner*—Avraham Lerner
(74) *Attorney, Agent, or Firm*—James Creighton Wray; Meera P. Narasimhan

(57) ABSTRACT

A modular suspension strut apparatus provides a bicycle with a relocatable center of gravity to adjust the bicycle to the rider and to terrain conditions. The combined center of gravity of a bicycle and rider is adjustable by moving and clamping a strut within a strut tube. A crank axle housing at the bottom of the strut and a seat post at the top are shifted vertically, while maintaining a fixed seat axle distance. The strut is resiliently mounted within the strut tube by an internal or external spring or springs to absorb shocks. Spring force is adjusted by adjusting an air pressure with an external air pump or on board pumps. Spring forces may be adjusted while seated or in motion by turning knobs or handwheel rings and/or by other means. Strut movement within the strut tube is limited to axial reciprocation in a preset range. Elastomeric rings prevent shock at limits of the strut movements. The strut tube is made of three joined parts, a center tube and top and base guides. The guides connect to frame tubes and stays and provide bearings for the strut.

12 Claims, 20 Drawing Sheets

U.S. PATENT DOCUMENTS

| | | | |
|---|---|---|---|
| 589,328 A | 8/1897 | Barton | |
| 589,394 A | 8/1897 | Ohlgart | |
| 602,354 A | 4/1898 | Ohlgart | |
| 612,337 A | 10/1898 | Hall | |
| 635,964 A | 10/1899 | Horn | |
| 636,726 A | 11/1899 | Hindmarsh | |
| 677,079 A | 6/1901 | Guiley et al. | |
| 724,630 A | 4/1903 | Tramburg | |
| 740,554 A | 10/1903 | Guiley et al. | |
| 988,181 A | 3/1911 | Escalante et al. | |
| 1,573,849 A | 2/1926 | Nagot | |
| 2,623,573 A | 12/1952 | DiGaetano | |
| 2,856,982 A | 10/1958 | Leja | |
| 4,118,045 A | 10/1978 | Kanazawa | |
| 4,592,544 A | 6/1986 | Smith et al. | |
| 4,807,855 A | 2/1989 | Schuitema | |
| 4,881,750 A * | 11/1989 | Hartmann | 280/276 |
| 5,024,413 A | 6/1991 | Papp | |
| 5,094,424 A | 3/1992 | Hartway | |
| 5,158,268 A | 10/1992 | Schnitzius et al. | |
| 5,308,030 A | 5/1994 | Bales | |
| 5,320,375 A | 6/1994 | Reeves et al. | |
| 5,324,059 A | 6/1994 | Byrne | |
| 5,326,119 A | 7/1994 | Ganoung | |
| 5,382,039 A | 1/1995 | Hawker | |
| 5,383,705 A | 1/1995 | Voigt | |
| 5,553,880 A * | 9/1996 | McJunkin et al. | 280/283 |
| RE35,401 E * | 12/1996 | Wilson et al. | 280/276 |
| 5,857,691 A | 1/1999 | Fan | |
| 5,947,498 A * | 9/1999 | Rajaee | 280/276 |
| 6,026,939 A * | 2/2000 | Girvin et al. | 188/266.7 |
| 6,109,636 A * | 8/2000 | Klein et al. | 280/284 |
| 6,283,487 B1 | 9/2001 | Torre | |
| 2003/0127825 A1 * | 7/2003 | Chen | 280/287 |

\* cited by examiner

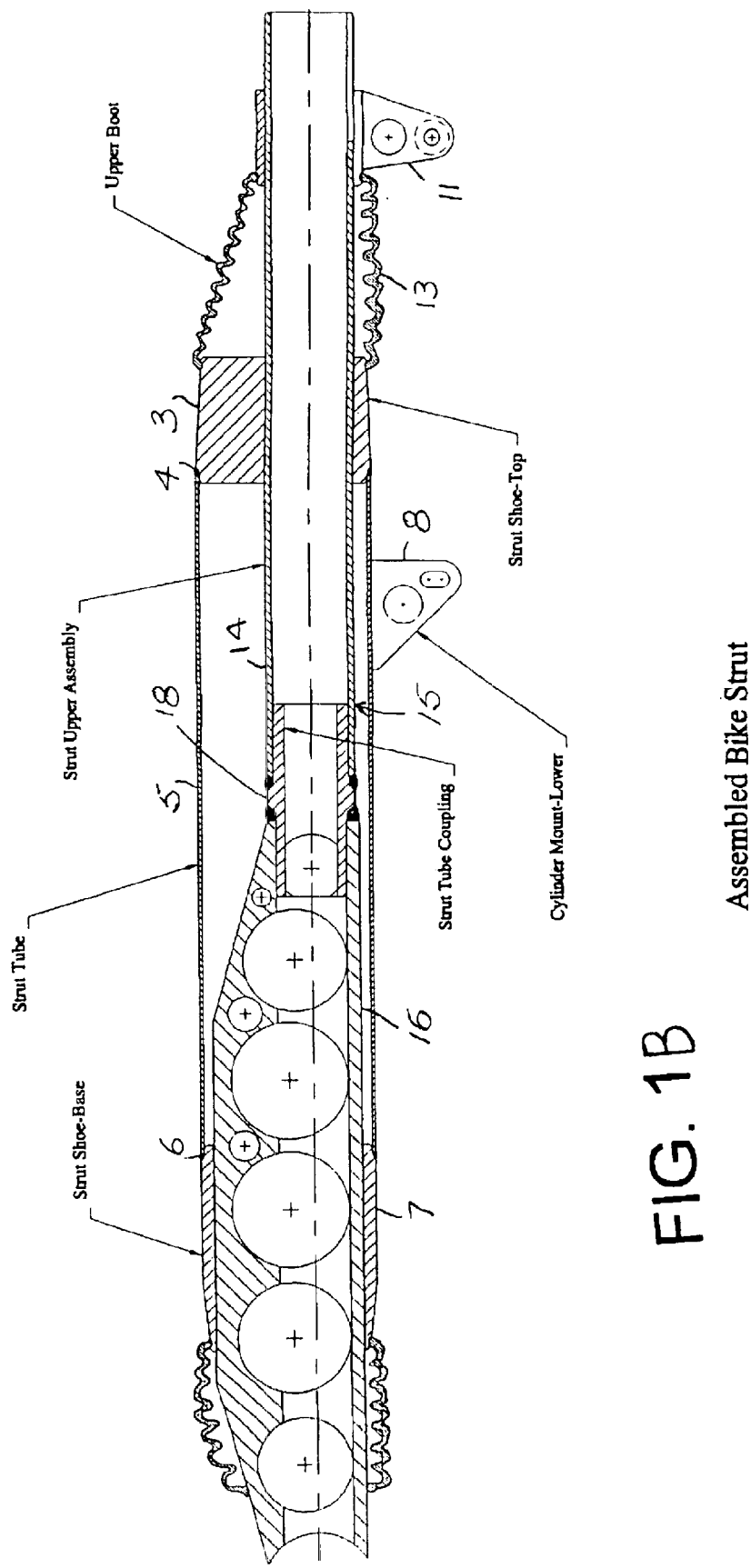
FIG. 1B    Assembled Bike Strut

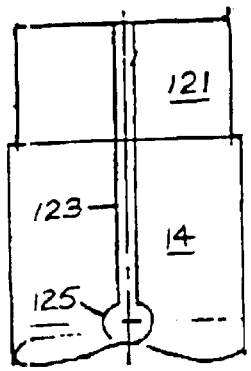
FIG. 18
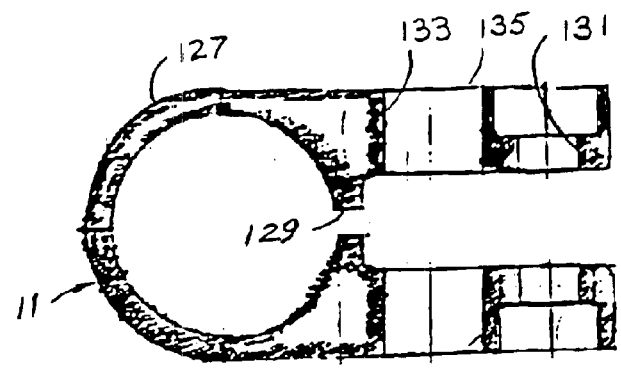
FIG. 20
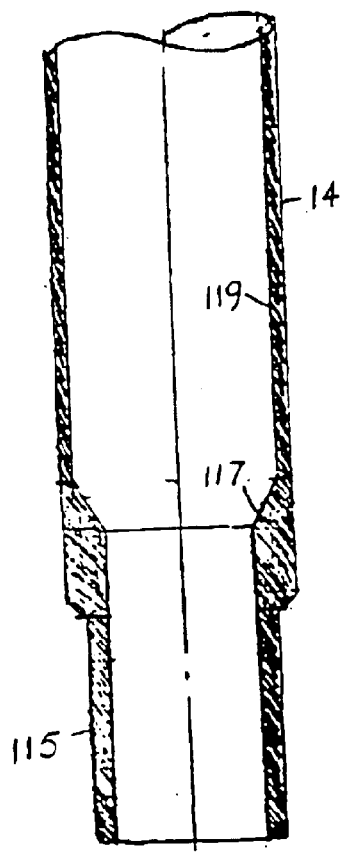
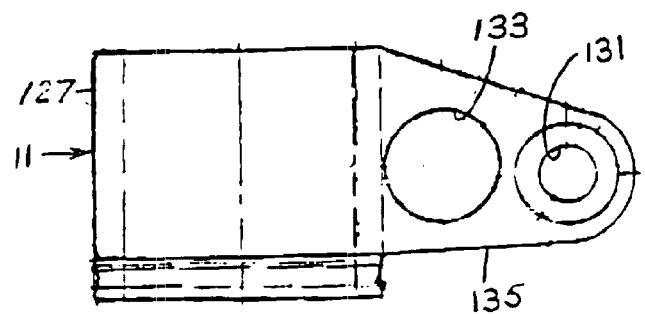
FIG. 19
FIG. 17

Assembly Schematic of Second Generation CGF

The ability to drop the strut out allows for interchangeable front crank sets and gear arrangements.

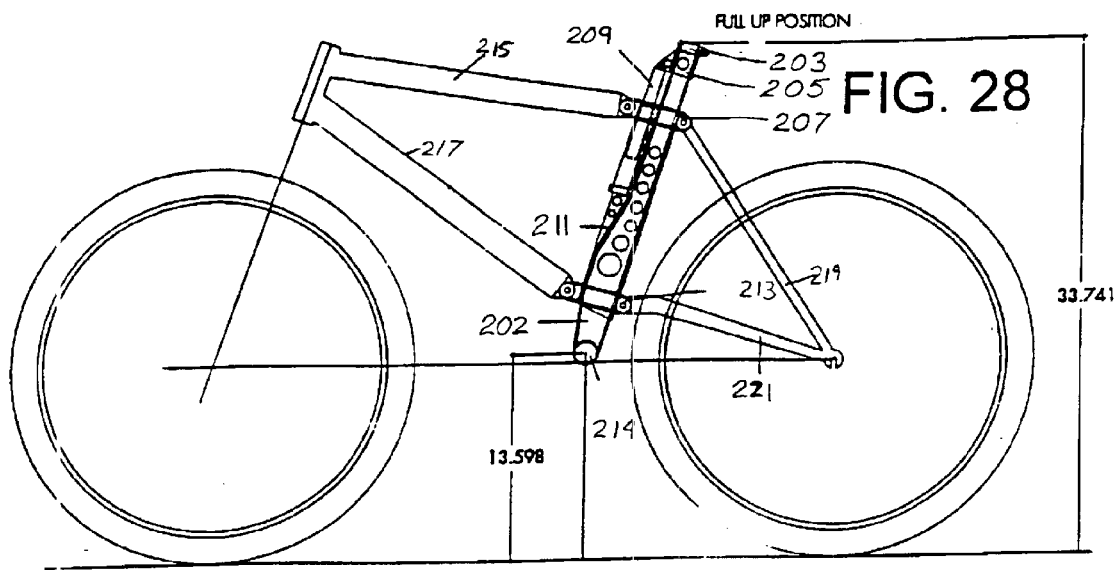
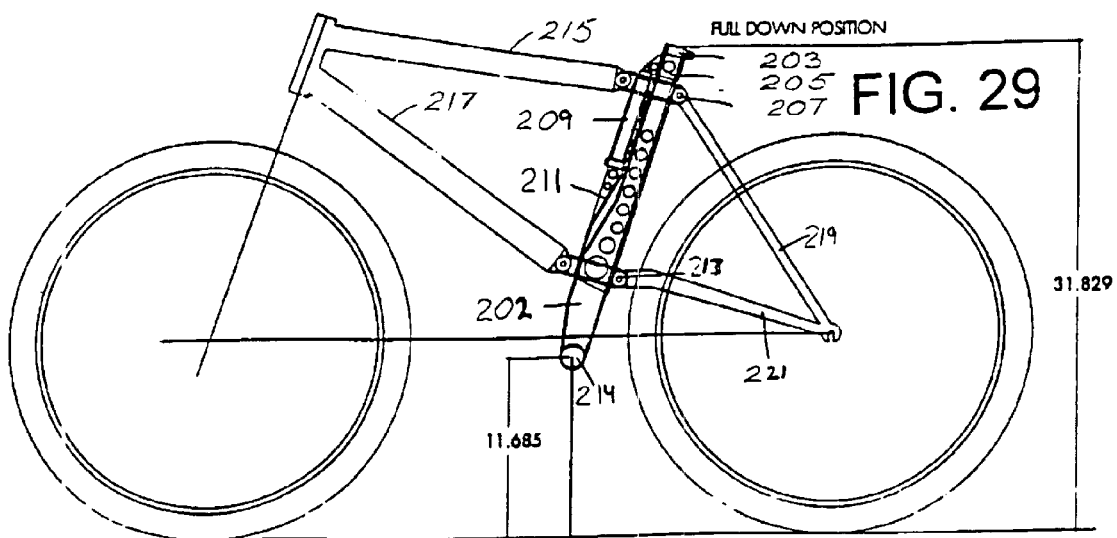

Schematic Illustrating why Force
Distribution Characteristics of the
Critical Geometry Frame Improve
Performance under Various
Riding Conditions

MODULAR SUSPENSION STRUT ASSEMBLY FOR BICYCLE PEDAL HEIGHT ADJUSTMENT

This is a continuation-in-part of Application 09/800,958 filed Mar. 8, 2001 now abandoned which was based on Provisional Application 60/187,878 filed Mar. 8, 2000.

BACKGROUND OF THE INVENTION

Bicycles have been and continue to be used by many for transportation, recreation and competition. Conditions on the road and off-road place demands on a rider's body, which may result in fatigue, discomfort and soreness. It is essential, then, that a rider be able to configure his bike to best accommodate his body and the frame. Needs exist for a means to easily and quickly adjust the static frame geometry.

In recent years, mountain bike suspension devices have expanded in variation and complexity, generating widespread interest and acceptance. Competitors in the sport need bicycle frames that reduce forces on the bike and shock to the rider. Off-road conditions increase the physical demands on a rider's body, thereby speeding fatigue and increasing discomfort. Needs exist for energy-absorbing apparatus for bicycles that reduce rider discomfort and fatigue and lessen frame loads.

Existing suspension devices have proven problematic. State-of-the-art suspension units fail to maintain the basic bicycle geometry. Critical spatial relationships, such as the distance between the seat and the pedals and frame angles relative to the wheelbase, are sacrificed in efforts to enhance comfort and reduce frame loads and rider fatigue. Current bicycle frames use rear wheel suspensions for absorbing energy. Rear wheels are trailing linked and sprung such that the wheels change relative to the static geometry of frame and wheel assemblies when energy is absorbed, compromising pedaling and braking efficiency. Seats may be sprung relative to the frames, but that results in undesirable seat/pedal distance variations. Other suspension designs, such as flex-stem handlebars, strut-type energy absorbing forks, and flex frames, are hindered by similar critical relationship flaws.

Needs exist for bicycle frames that do not compromise critical geometry when suspension devices are incorporated. Since weights of riders are typically six times that of bicycles, frequent and abrupt suspension movements and subsequent changes in bicycle geometry can decrease rider control, as well. Suspension systems that eliminate or substantially limit changes in the critical relationships of bicycle components are needed to enhance efficiency and control.

Suspensions need to be simple, sturdy and not susceptible to failure. Since off-road conditions are not constant, needs exist for suspension devices that are adjustable and easily customized by riders. Energy-absorbing mechanisms need to be compatible with conventional frame configurations and adaptable to newly designed lightweight frames.

SUMMARY OF THE INVENTION

This invention provides apparatus and methods to adjust the static frame geometry of the bicycle. One of the most effective ways to customize static frame geometry is to raise or lower the position of the bottom bracket, which houses the pedal crank spindle, relative to the frame.

Raising the bottom bracket provides more ground clearance, everything else being the same, but the key is, even slight adjustment here results in discernable and desirable changes in how the bike frame rides and feels to a given individual rider.

A self-contained, modular suspension strut assembly which provides for such adjustment and permits any competent custom frame builder or bike manufacturer to weld such assembly into various frame configurations is an object of the present invention. Such adjustability does not interfere with the function of the suspension strut.

The self-contained, modular strut assembly of the present invention comprises a top strut guide, a strut tube and a bottom strut guide. A bracket may be attached to the strut tube in certain embodiments for connecting the strut tube to a commercially available adjustable air spring or other energy-absorbing mechanism. The top strut guide, strut tube and bottom strut guide are unitized, for example by welding at the joints between tube and guides; this assembly is in turn welded into a bike frame in a manner similar to present fabrication practice.

In one form of the invention the bottom bracket of a bicycle, which houses the pedal crank spindle, relative to the frame, is secured in the desired position relative to the frame. In this embodiment, the bottom bracket position may be secured by adjustable clamp means. That allows a strut to be moved vertically relative to said clamp and frame, lifting or lowering the strut, seat and bottom bracket as a unit. The desired static position relative to the frame is secured by tightening said clamp. This embodiment does not provide for suspending the strut.

In a preferred embodiment of the invention, the strut is suspended in a way so that the strut, bottom bracket seat post and seat can move as a unit relative to the frame. Such movements are described in U.S. Pat. No. 5,553,880, which is incorporated herein by reference. In this invention, new strut assemblies and suspensions are described. This invention further provides adjustments of the suspension for positioning and controlling the range and limits of movement and increasing and decreasing mechanical and air spring forces and stiffness.

The components of the self-contained, modular strut assembly of the present invention are a top strut guide, a strut tube and a bottom strut guide. These components are unitized, for example by welding at the seams between the strut tube and the strut guides. A bracket may be attached to the strut tube for connecting the strut tube to a commercially available energy absorbing mechanism, for example an air spring. The strut is fitted through the guide/tube assembly extending vertically through the unitized top strut guide, strut tube and bottom strut guide.

In a preferred embodiment, the opening in the bottom strut guide is rectangular in shape. However, the opening may have a variety of shapes. The upper strut guide is circular, but may have other shapes as well.

A bottom bracket is attached to the bottom of the strut for attaching a pedal crank spindle and pedals. The assembled strut with the bottom bracket is slid upward through the bottom or base strut guide, the strut tube and the top strut guide. A strut/spring clamp fits over the upward extending portion of the strut. An additional clamp fits over the top extended portion of the strut for securing a seat post in the top of the strut. The bottom bracket may be adjusted vertically by loosening the upper strut/spring clamp, allowing the strut to be slidably moved relative to said clamp. Once the desired vertical position of the bottom bracket is achieved, this position is secured by tightening the strut/spring clamp around the strut.

A preferred embodiment of the modular strut assembly in the suspended strut form of the present invention comprises a bracket on the strut/spring clamp for connecting the strut to an externally mounted energy absorbing mechanism, such as, but not limited to, an adjustable air cylinder. A dust boot may extend from the bottom of the strut/spring clamp to the top of the top strut guide, for keeping out dirt and debris and sealing in lubrication. The dust boot may be expandable to adapt to different strut heights, and to flex with strut movement. A similar dust boot may be used at the bottom of the strut.

One embodiment of the suspended modular strut assembly of the present invention incorporates an energy absorbing mechanism such as, but not limited to, an air cylinder, housed along with the strut within the unitized top strut guide and strut tube. In a preferred embodiment, the strut tube has an outside diameter of 2.84 inches, however, the strut tube may have any outside diameter sufficient to accommodate components. The air spring fits within a chamber which extends through the top strut guide and the strut tube. In a preferred embodiment, the upper chamber is circular in shape; however the chamber may be rectangular, trapezoidal, square, triangular or oval in shape. The air spring is connected at the top to the strut/spring clamp and at the -a bottom to a bracket attached to the inside circumference of the strut tube. Alternatively, the bottom portion of the air spring may be connected to the lower strut guide.

A dust boot may be attached to the strut/spring clamp and the air spring and extend to cover the top portion of the top strut assembly. The dust boot functions to keep the strut and air spring free of dirt, debris and water. The dust boot is capable of expanding and contracting to accommodate various strut heights.

An additional clamp may be fitted around the strut above the strut/spring clamp for securing a seat post and adjusting the height of a seat.

In one embodiment of the present invention, energy absorbing mechanisms such as, but not limited to, two air cartridges, attached at lower ends to the strut tube, are attached at upper ends to the strut/spring clamp. The energy absorbing mechanisms may be attached to the strut/spring clamp by a bolt, pin or by other means.

In another embodiment, the energy absorbing mechanisms, for example, air cartridges extend through the top strut guide and the strut tube. The energy absorbing mechanisms are linked to share a common fill valve, which may be filled, for example, with hydraulic fluid or compressed air.

In one embodiment, the strut and both energy-absorbing mechanisms are housed within the top strut guide and the strut tube. In a preferred embodiment, the outer diameter of the strut tube measures 2.84 inches, however, the outer diameter of the strut tube may be varied. The strut is flanked by energy absorbing mechanisms, for example, two air cartridges, which extend through the unitized top strut guide and strut tube.

A dust boot connects to a stop ring extending around the strut/spring clamp. The dust boot extends downward and connects to the top portion of the top strut guide. The dust boot may be capable of expanding and contracting to accommodate vertically moving the strut and energy absorbing means.

One preferred embodiment of the modular strut assembly of the present invention incorporates an energy absorbing mechanism that is concentric to, and surrounds the strut. A coil spring, or an equivalent energy absorbing mechanism, surrounds the strut. The bottom of the coil spring is attached to or rests on an annular piston in an annular cylinder. Pressure in the cylinder may be adjusted to preload the coil spring. The annular piston rests atop the annular air chamber. The air chamber may have a valved port to adjust and preload the air pressure within the chamber. The strut has an annular lip which carries an O-ring located below the air chamber to limit rebound.

In that embodiment, the strut/spring clamp connects to a threaded sleeve which extends downward from the clamp and fits around the outer diameter of the strut. The stop ring has a cup which holds thrust needle bearings for easy adjustment. A threaded stop ring is connected to the sleeve just below the strut/spring clamp. The stop ring extends horizontally outward from the sleeve and has flanges which extend downward toward the top strut housing.

Alternatively and preferably, the invention uses double acting adjustable fluid filled shock absorbers which absorb energy and dampen responses in both up and down directions. Bumps are attached to the stop ring to provide for hand adjustment traction. In its engaged position, the stop ring rests on the upper surface of the spring above the outer lip of the top strut guide.

A dust boot attaches to the outer surface of the stop ring. The bottom portion of the dust boot floats around the outer lip of the top strut guide, allowing the stop ring to rotate for adjustment of spring pre-compression.

In a preferred embodiment, the strut tube assembly has top and bottom guides and a central oval tube. The top and bottom guides have strut-receiving apertures and weight reducing holes. The strut base has a rectangular cross-section which slides within the bottom strut guide. Weight-reducing holes extend horizontally through the lower section. The crank bottom bracket is welded to the bottom of the strut base. At its upper end, the strut is tubular, fitting snugly in the thru-bore of the upper guide.

New energy-absorbing apparatus for bicycle frames permit seat and pedal assemblies to maintain a fixed spatial relationship with each other while moving as units relative to bicycle frames. The present invention reduces shock to the rider and forces on the bicycle while minimizing change in the basic frame geometry. The seat and the pedal crank axle housing move vertically together as a single unit, thus maintaining the dimensional relationship between the two components. That allows for suspension action without altering the critical geometrical relationships of the bicycle. Frames can be both strong and lightweight, providing enhanced efficiency and control.

The present invention has an outer portion that forms part of the bicycle frame. Preferably, that portion has an outer tube that houses a close-fitting inner tube to which a seat and a pedal crank axle housing are mounted. The outer tube is a fixed part of the frame. The remainder of the bicycle frame members are connected to the outer tube. The outer tube and the inner tube are coupled such that movement of the seat and pedals, and hence movement of the inner tube is suspended and damped by spring means connected to the outer tube. The seat and the pedal crank axle housing maintain the same spatial relationship and move, relative the frame, as a unit.

The energy-absorbing apparatus is rugged, adjustable and compatible with existing conventional bicycle frame configurations and suspension devices. The modular strut suspension also allows for lighter frame structures. Cross-sectional shapes of the inner tube and the outer tube may prevent rotation relative to each other.

These and further and other objects and features of the invention are apparent in the disclosure, which includes the above and ongoing written specification, with the drawings.

BRIEF DESCRIPTION OF THE DRAWINGS

FIG. 1B is an assembled view of the strut assembly.

FIG. 17 is a cross-sectional detail of a lower end of a strut top.

FIG. 18 is an elevational detail of an upper end of the strut top.

FIG. 19 is an elevation of a strut clamp/spring mount.

FIG. 20 is a horizontal cross-sectional detail of the strut clamp/spring mount.

FIG. 28 shows an embodiment of the present invention in its full up position having an air cylinder at the top of the telescoping unit underneath the seat and at the bottom of the telescoping unit above the pedal crank axle housing.

FIG. 29 shows an embodiment of the present invention in its full down position having an air cylinder at the top of the telescoping unit underneath the seat and at the bottom of the telescoping unit above the pedal crank axle housing.

DETAILED DESCRIPTION OF THE PREFERRED EMBODIMENTS

Figure 1A:
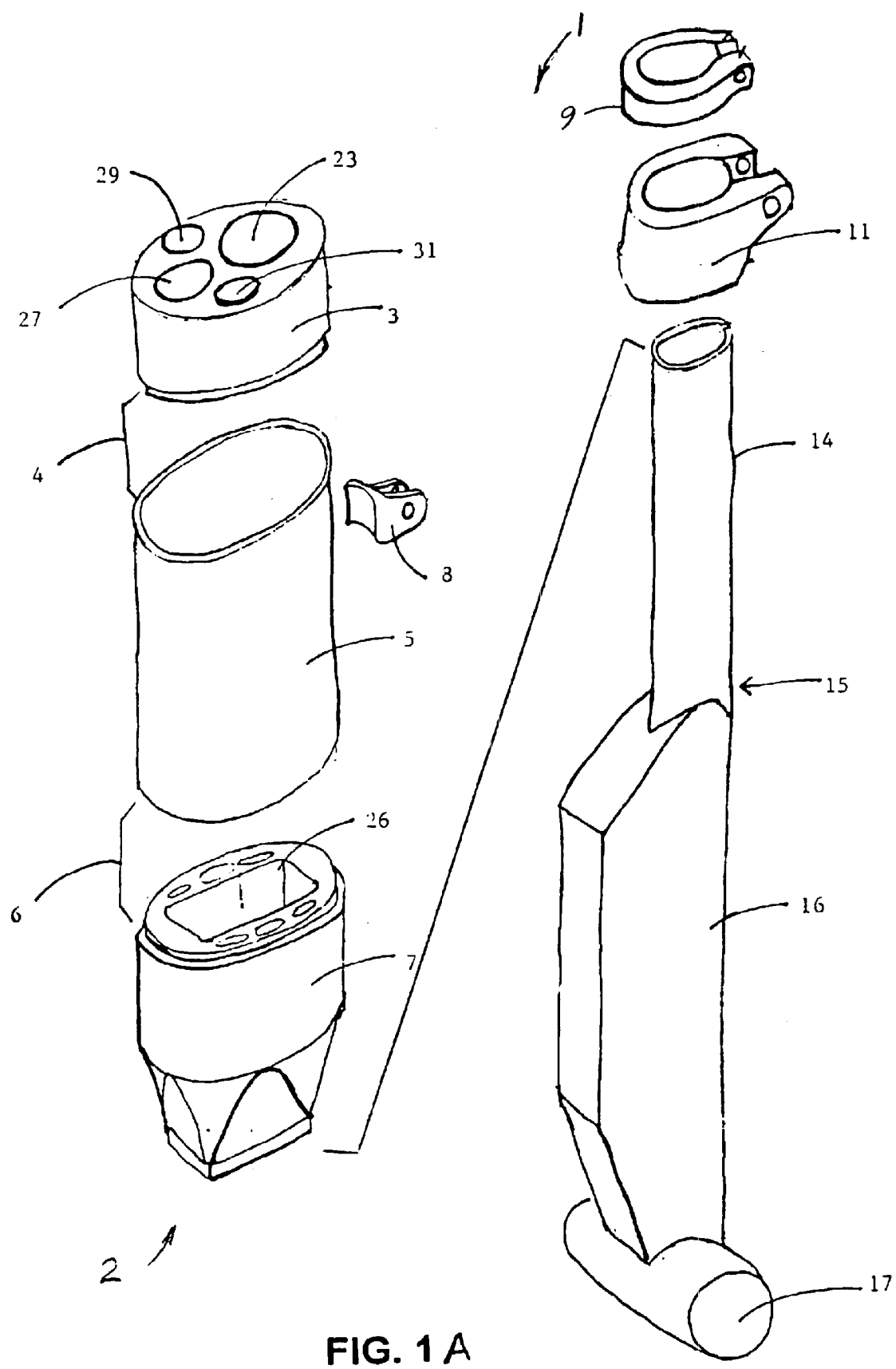
FIG. 1A is an exploded view showing components of the self-contained, modular strut assembly of the present invention.

FIGS. 1A and 1B show the components of the self-contained, modular strut and strut assembly 1 of the present invention. The modular strut tube assembly 2 comprises a top strut guide 3, a main strut tube 5 and a bottom strut guide 7. These components are unitized, for example, by welding at the seams 4 and 6 between the strut tube 5 and the strut guides 3, 7. After the strut is assembled in the tube assembly, a bracket 8 may be attached to the strut tube 5 for connecting the strut tube 5 to a commercially available energy absorbing mechanism, for example, an air spring. A tubular strut 15 has a cylindrical upper part 14. Upper part 14 is fitted through a cylindrical chamber 23 which extends vertically through the unitized top strut guide 3. Main strut tube 5 is hollow. Bottom strut guide 7 has an opening 26 which is rectangular in shape. However, the opening 26 and corresponding strut portion 16 may be oval, trapezoidal, square or triangular in shape. A coupling 18 connects the strut parts.

A bottom bracket 17 is attached to the bottom of the strut 15 for attaching a pedal crank spindle, on which cranks and pedals are mounted. A strut/cylinder clamp 11 fits over and is clamped to the upper cylindrical portion 14 of the strut 15. An additional clamp 9 at the top of cylindrical portion 14 of the strut 15 clamps a seat tube in the strut 15.

After the strut/spring clamp 11 has been connected to the air spring cylinder or like means, the upper portion (and bottom bracket 17) may be adjusted vertically by loosening the upper strut/spring clamp 11 on the strut 15. That allows the strut 15 to be slidably moved relative to the strut/spring clamp 11. Once the desired upper vertical position of the bottom bracket 17 is achieved, the upper position is held static by tightening the strut/cylinder clamp 11 around the strut 15. That adjusts the feel of the bicycle for a rider as well as the pedal clearance and the bottom bracket height. The range of travel of the unitary bottom bracket 17, strut 15, clamp 11, clamp 9, seat tube and seat is controlled by the air spring cylinder or like means. The strut adjustment controls the bottom bracket height. Air pressure adjusts the pre-compression of the suspension.

Figure 2:
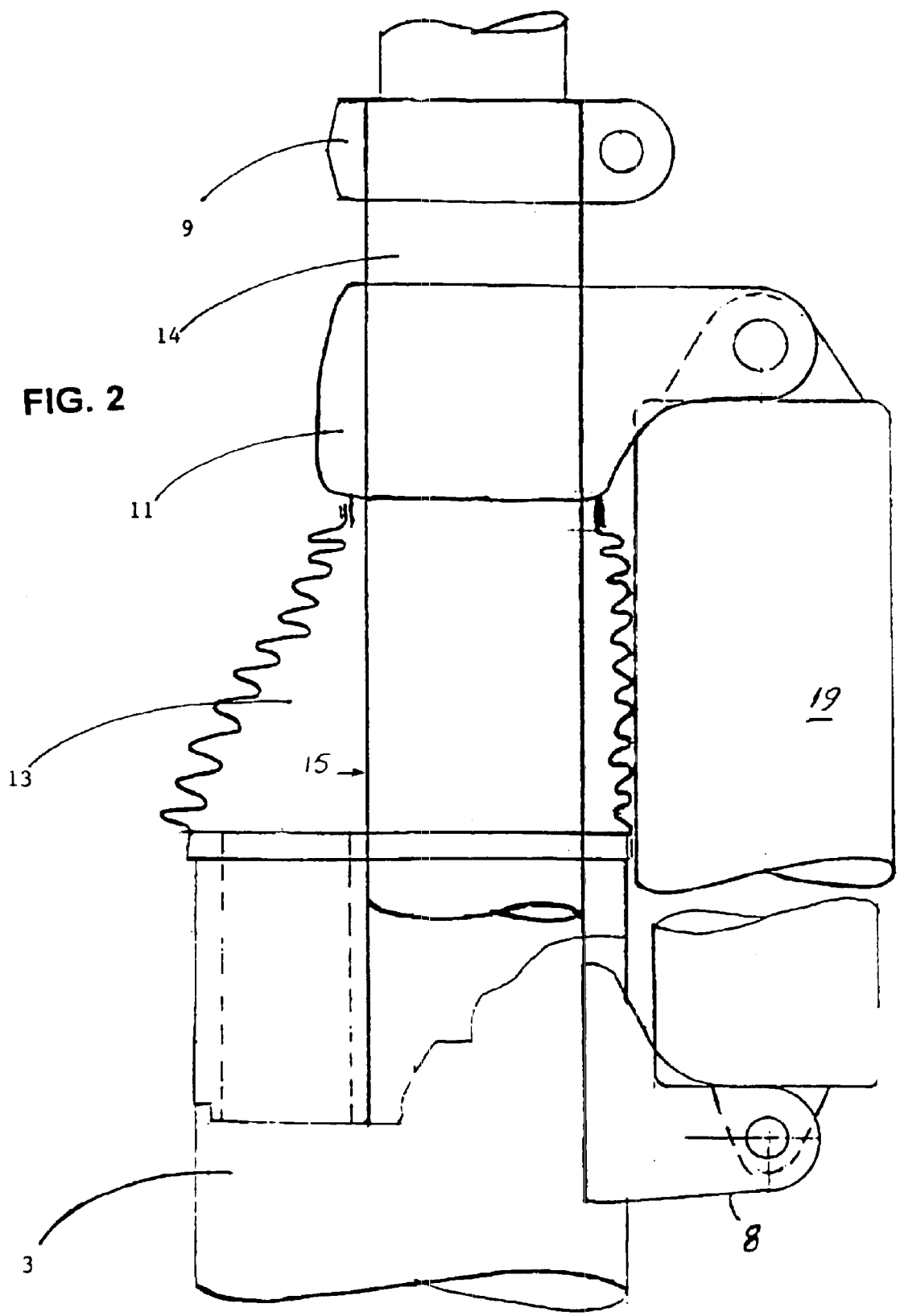
FIG. 2 shows a detail of an embodiment of the modular strut assembly of the present invention in which an energy-absorbing mechanism is mounted external to the unitized strut tube and top strut guide.

In embodiments which use strut suspension, FIG. 2 shows a detail of one configuration of the modular strut assembly of the present invention. In this embodiment, a bracket 8 and the strut/cylinder clamp 11 connect the top of the strut 15 to an externally mounted energy absorbing mechanism, such as, but not limited to, an adjustable air spring 19. A dust boot 13 extends from the bottom of the strut/cylinder clamp 11 to the top of the top strut guide 3, keeping out dirt and debris. The dust boot 13 is expandable to adapt to different strut 15 heights.

Figure 3:
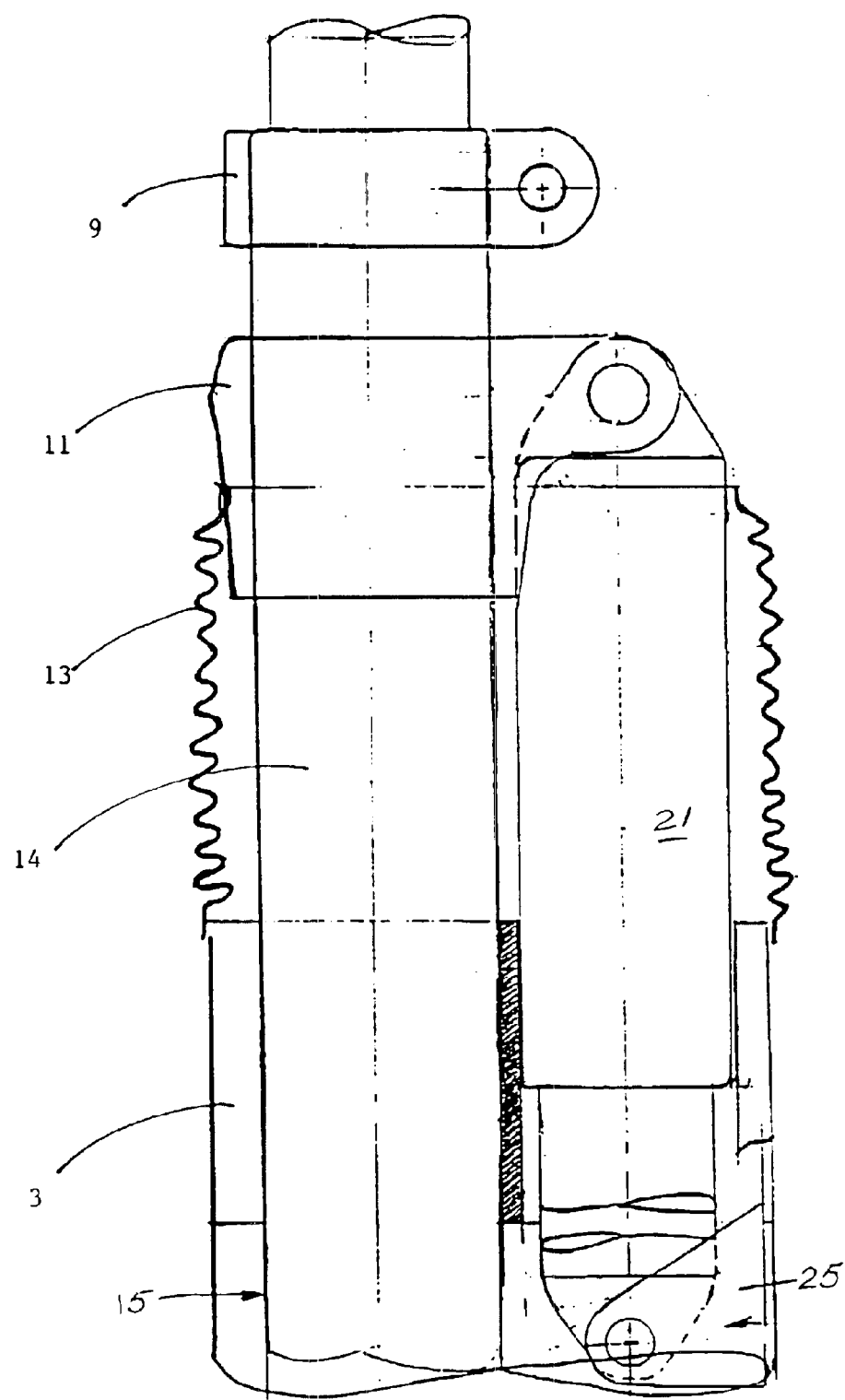
FIG. 3 shows a detail of an alternative embodiment of the modular strut assembly of the present invention in which an energy-absorbing mechanism is housed within the unitized strut tube and top strut guide.

FIG. 3 shows an alternative embodiment of the modular strut assembly of the present invention. FIG. 3 shows an embodiment in which an energy absorbing mechanism, such as, but not limited to, an air spring 21 is housed along with the strut 15 within the unitized top strut guide 3 and strut tube 5. In a preferred embodiment, the strut tube 5 has an outside diameter of 2.84 inches, however, the strut tube 5 may have any outside diameter. The air spring 21 fits within a chamber which extends through the top strut guide 3. In a preferred embodiment, the chamber is circular in shape; however the chamber may be rectangular, trapezoidal, square, triangular or oval in shape to accommodate the shape of the air spring 21. The air spring 21 is connected by pins at the top to the strut/spring clamp 11 and at the bottom of the air spring 21 to a bracket 25 attached to the inside circumference of the strut tube 5. Alternatively, the bottom portion of the air spring 21 may be connected to the top or base strut guide 3 or 7.

A dust boot 13 attached to the strut/cylinder clamp 11 and the air spring 25 extends to cover the top portion of the top strut guide 3. The dust boot 13 functions to keep the strut 15 and air spring 21 free from dirt, debris and water. The dust in boot 13 is capable of expanding and contracting to accommodate various strut 15 heights.

An additional clamp 9 may be fitted around the strut 15 above the strut/cylinder clamp 11 for attaching a seat post and adjusting the height of a seat.

Figure 4:
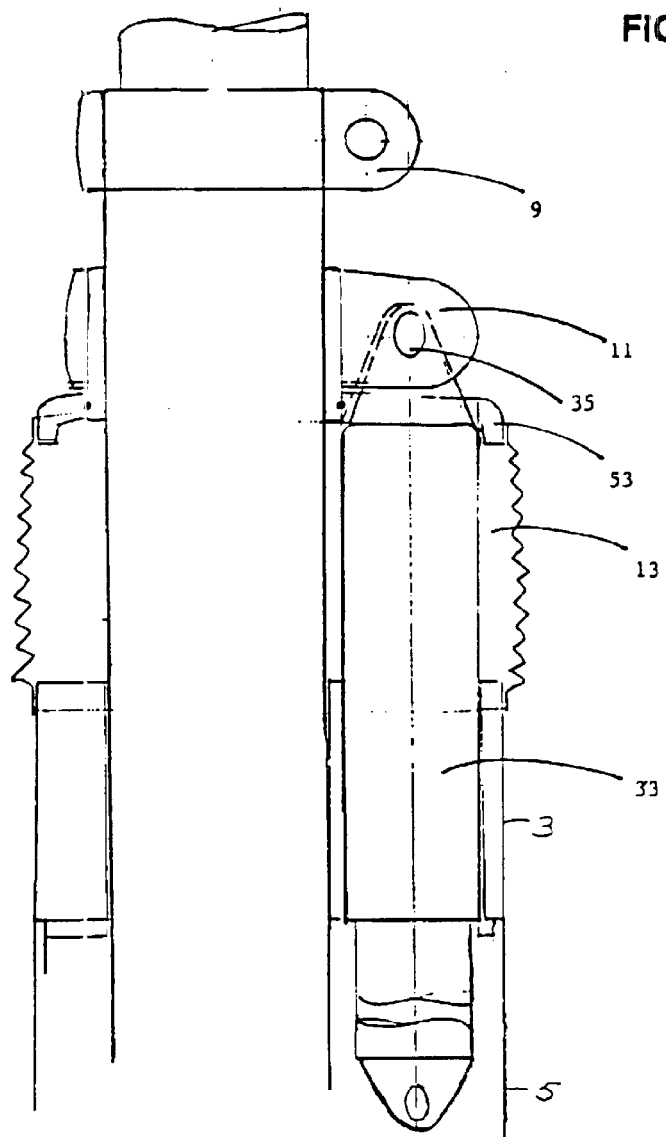
FIG. 4 shows an alternative embodiment of the modular strut assembly of the present invention in which two energy-absorbing mechanisms are connected to the strut and are housed within the strut tube and the top strut guide.

In the embodiment of the modular strut assembly of the present invention shown in FIG. 4, two energy absorbing mechanisms, such as, but not limited, to air cartridges 33 are attached to the strut/cylinder clamp 11. The energy absorbing mechanisms may be attached to the strut/cylinder clamp by one or more bolts 35 or by other means.

The two energy absorbing mechanisms, for example, air cartridges 33 are housed within two chambers 29, 31 which extend through the top strut guide 3 and the strut tube 5. The energy absorbing mechanisms are linked to share a common fill valve, for example, with hydraulic fluid or compressed air.

The strut top 14 of strut 15 and both energy-absorbing mechanisms 33 are housed within the top strut guide 3 and within the strut tube 5. In a preferred embodiment, the outer diameter of the strut tube 5 measures 2.84 inches, however, the outer diameter of the strut tube 5 may be varied. A dust boot 13 connects to a stop ring 53 extending from the strut/cylinder clamp 11. The dust boot 13 extends downward and connects to the top portion of the top strut guide 3. The dust boot 13 is capable of expanding and contracting to accommodate vertically moving the strut top 14 and the energy absorbing means 33.

Figure 5:
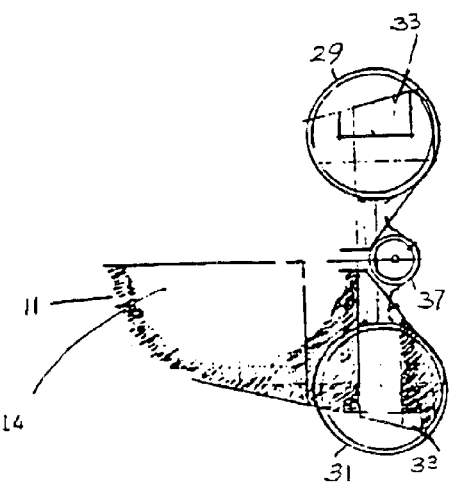
FIG. 5 shows a horizontal cross-sectional view of the embodiment of FIG. 4.

FIG. 5 shows a horizontal cross-sectional view of the embodiment of FIG. 4. The strut top 14 is flanked by two energy-absorbing mechanisms, for example, air cartridges 33 which are fitted into chambers 29, 31 which extend through the unitized top strut guide 3 and strut tube. Both energy-absorbing mechanisms are connected to a fill valve 37.

Figure 6:
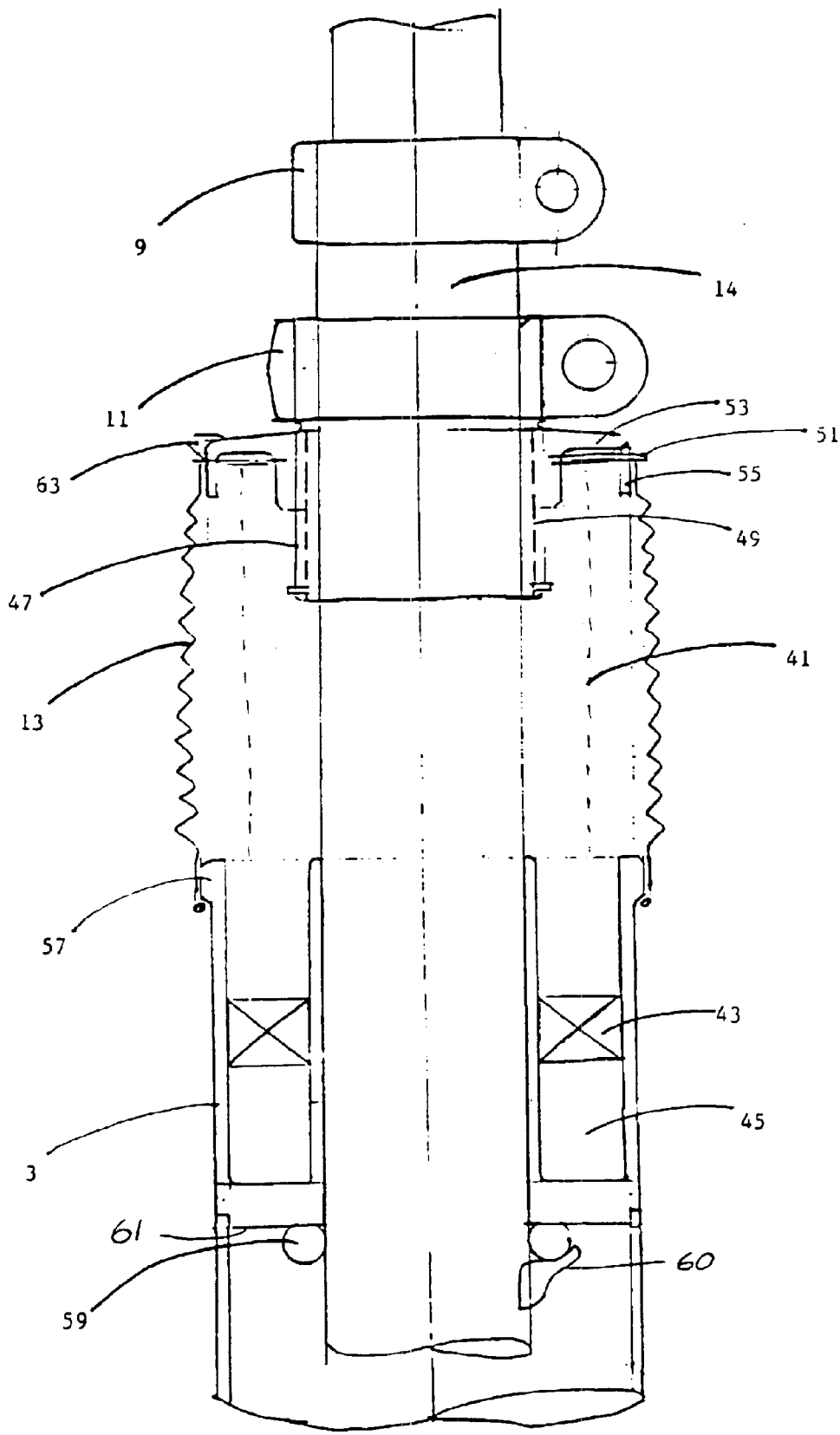
FIG. 6 shows an embodiment of-the modular strut assembly of the present invention in which the energy absorbing mechanism is concentric within the strut tube and surrounds the strut.

FIG. 6 shows a preferred embodiment of the modular strut assembly of the present invention in which the energy absorbing mechanism is concentric to, and surrounds the strut top 14. A coil spring 41 or an equivalent energy absorbing mechanism surrounds the strut top 14. The bottom portion of the coil spring 41 is attached to an annular piston 43, which may be adjusted to preload the coil spring 41. The annular piston 43 rests atop an air chamber 45. The air chamber 45 may have a valved port to adjust and preload the air pressure within the chamber 45. An O-ring rebound stop 59 is supported on a bracket 60 located below the air chamber 45 to contact the bottom 61 of the top guide 3.

The strut/cylinder clamp 11 connects to a sleeve 47 which extends downward from the clamp 11 and fits around the outer diameter of the strut top 14. The sleeve 47 has external threads 49. A stop ring 53 is threaded on the sleeve 47 just below the strut/cylinder clamp 11. The stop ring 53 has a needle thrust bearing 51 engaging the top of the spring for easy adjustment. The stop ring 53 extends horizontally outward from the sleeve 47 and has flanges 55 which extend downward toward the top strut guide 3 and hold the needle bearing 51. Bumps 63 are attached to the stop ring 53 to provide finger-gripping traction. In its fully adjusted and fully compressed position, the stop ring 53 flanges 55 contact the outer lip 57 of the top strut guide 3, preventing the strut/cylinder clamp 11 from entering into the top guide 3 and damaging the annular piston 43 housed therein.

A dust boot 13 attaches to the flanges 55 extending from the stop ring 53. The bottom portion of the dust boot 13 floats around the outer lip 57 of the top strut housing 1, allowing the stop ring 53 to rotate.

An additional clamp 9 is fitted around the strut 14, above the strut/cylinder clamp 11 for holding a seat post.

Figure 7:
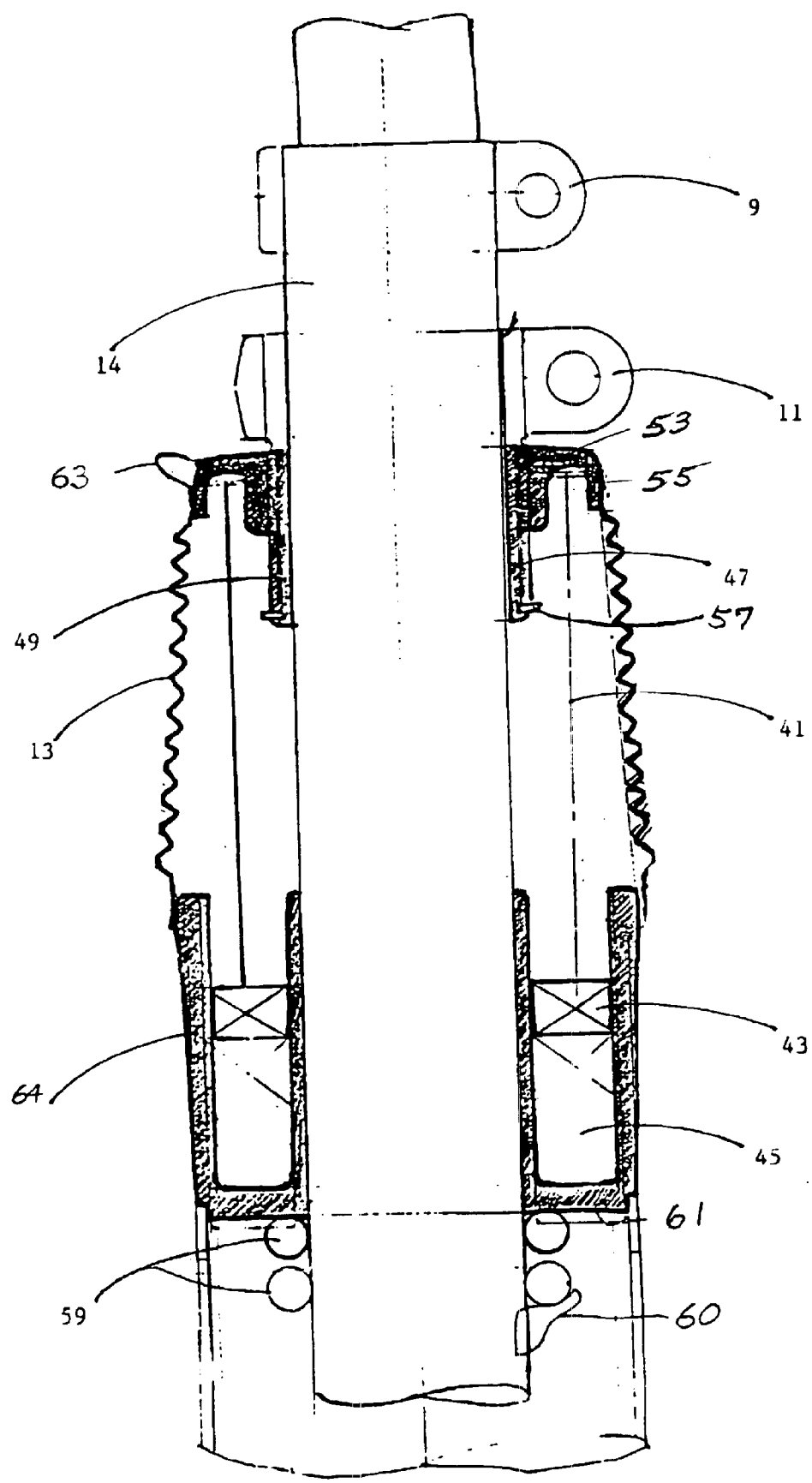
FIG. 7 shows the modular strut assembly of FIG. 6 in which the energy absorbing mechanism has a minimized envelope. Strut upward travel stops are shown in FIGS. 6 and 7.

FIG. 7 shows one embodiment of the modular strut assembly of the present invention in which the energy absorbing mechanism is concentric to, and surrounds the strut top 14 with a minimized envelope. A coil spring 41 or an equivalent energy absorbing mechanism surrounds the strut top 14. The bottom portion of the coil spring 41 is attached to an annular piston 43, which may be adjusted to preload the coil spring 41. The annular piston 43 rests atop an air chamber 45. The air chamber 45 may have a valved port to adjust and preload the air pressure within the chamber 45. The outside wall 64 of the top strut guide 3 is thick to allow for welding. O-ring rebound stops 59 are located below the top guide 3 and the air chamber 45.

The strut/cylinder clamp 11 is connected to a sleeve 47 which extends downward from the clamp 11 and fits around the outer diameter of the strut 14. The sleeve 47 is threaded 49. A stop ring 53 is threaded on the sleeve 47 below the strut/cylinder clamp 11. The stop ring 53 extends horizontally outward from the sleeve 47 a minimum distance and has flanges 55 which extend downward toward the top strut guide 3. Bumps 63 on the stop ring 53 provide hand traction. In its full downward adjusted position, with the spring compressed, the stop ring 53 rests on a snap ring in the sleeve 47.

A dust boot 13 attaches to the flanges 55 extending from the stop ring 53. The bottom portion of the dust boot 13 floats around the outer lip 57 of the top strut guide 3, allowing the stop ring 53 to rotate.

An additional clamp 9 is fitted around the strut 14, above the strut/cylinder clamp 11 for holding a seat post.

Figure 8:
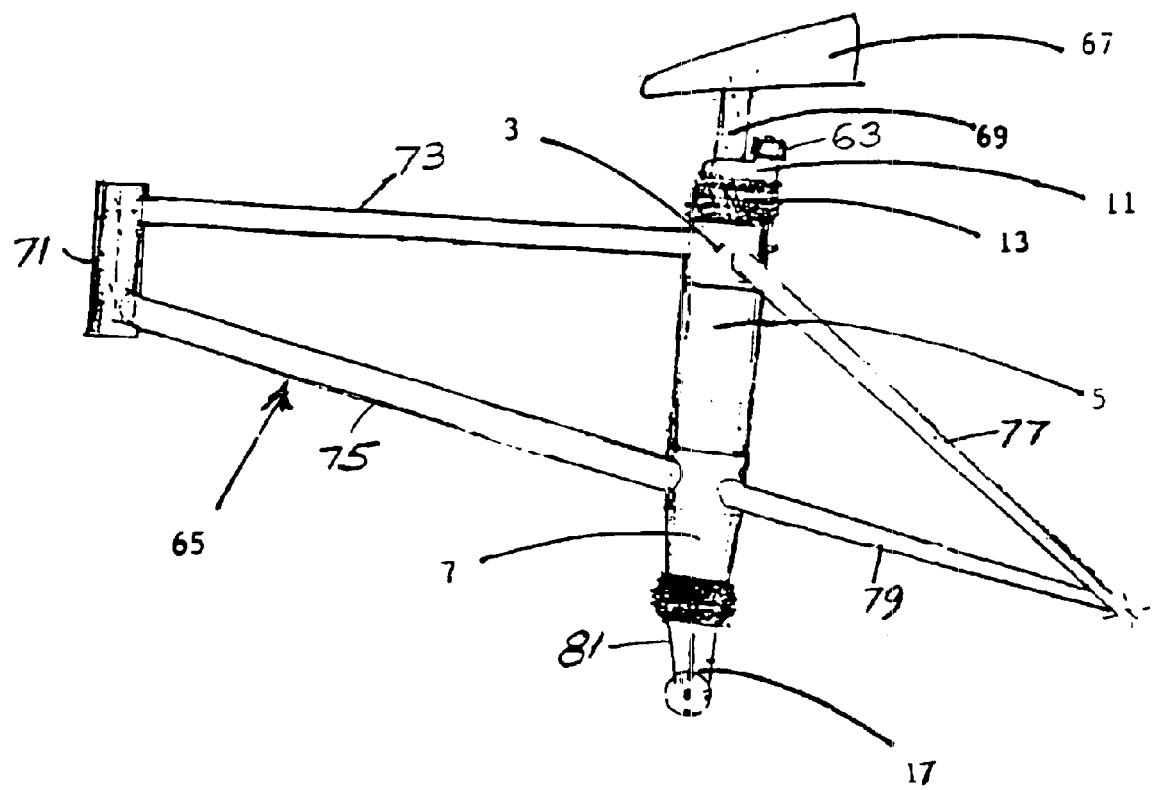
FIG. 8 illustrates a bicycle frame in which the present invention is installed.

FIG. 8 is a schematic representation of the modular strut assembly of the present invention in place on a bicycle frame 65. As shown in FIG. 8, a bicycle frame having the present invention is generally indicated by the number 65. The bicycle has a seat 67 and a seat post 69, a head tube 71 and a strut tube 5. The top tube 73 and down tube 75 are welded to the head tube 11 and to the top strut guide 3 and the bottom strut guide 7, respectively. The rear stays 77 and the chain stays 79 are also welded to the top strut guide 3 and the bottom strut guide 7, respectively. The bottom bracket 17 is welded on the strut base 81, and the clamp 11 is connected near an upper end of the strut.

Figure 9:
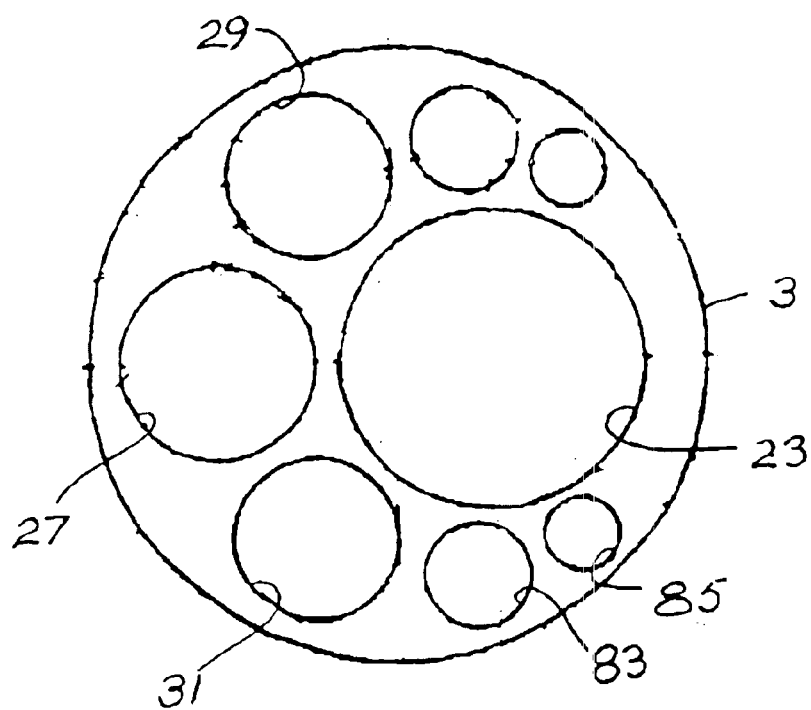
FIG. 9 is a view of a top strut guide similar to the top guide shown in FIG. 1.

As shown in FIG. 9, one strut top guide 3 has a main aperture 23 for receiving the strut. Lightening holes 27, 29, 31 and smaller lightening holes 83, 85 are formed through the strut top guide to lighten the guide.

Figure 10:
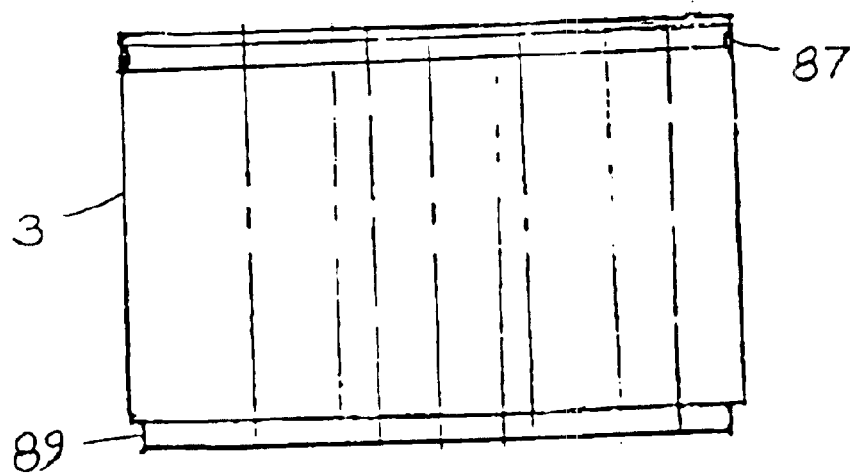
FIG. 10 is an elevation of the strut tube top guide shown in FIG. 9.

As shown in FIG. 10, the strut top guide 3 has a slight relief 87 at its top for receiving the dust boot. An indented portion 89 at the base of the strut top guide 3 fits within the upper end of the strut tube 5.

Figure 11:
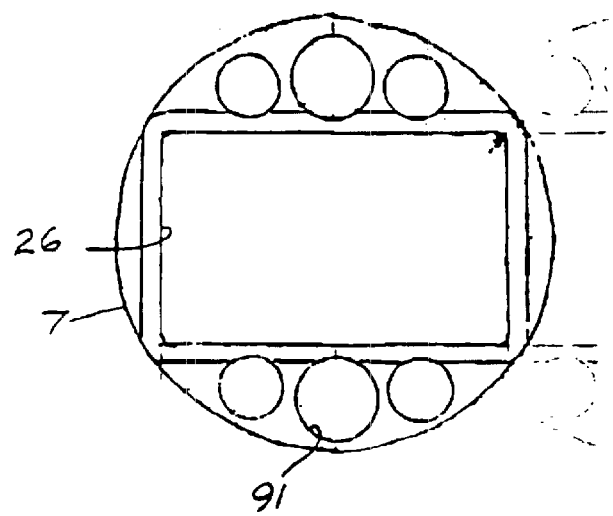
FIG. 11 is a top view of a strut tube base guide.

As shown in FIG. 11, the strut tube base 7 has a central rectangular aperture 26 for receiving the strut base and has several lightening holes 91 which reduce its weight.

Figure 12:
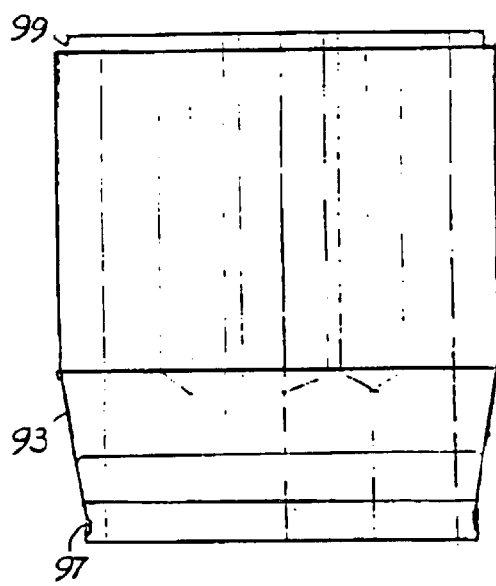
FIG. 12 is an elevation of the strut tube base guide.
Figure 13:
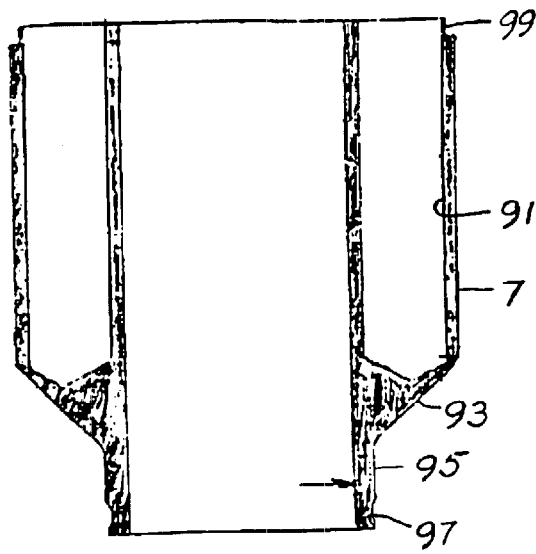
FIG. 13 is a cross-section of the strut tube base guide.

As shown in FIGS. 12 and 13, the lightening holes 91 are blind holes terminating above the inward sloping walls 93. A recess 97 at the lower end of the extension 95 holds the top edge of the lower boot. The recessed area 99 at the top of the strut guide base 7 fits within the lower end of the strut tube 5.

Figure 14:
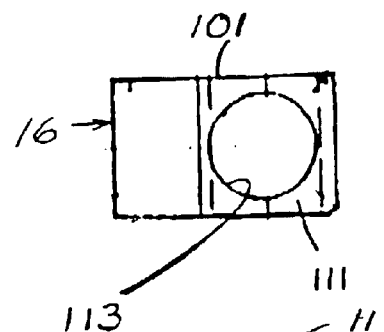
FIG. 14 is a plan view of a strut base.
Figure 16:
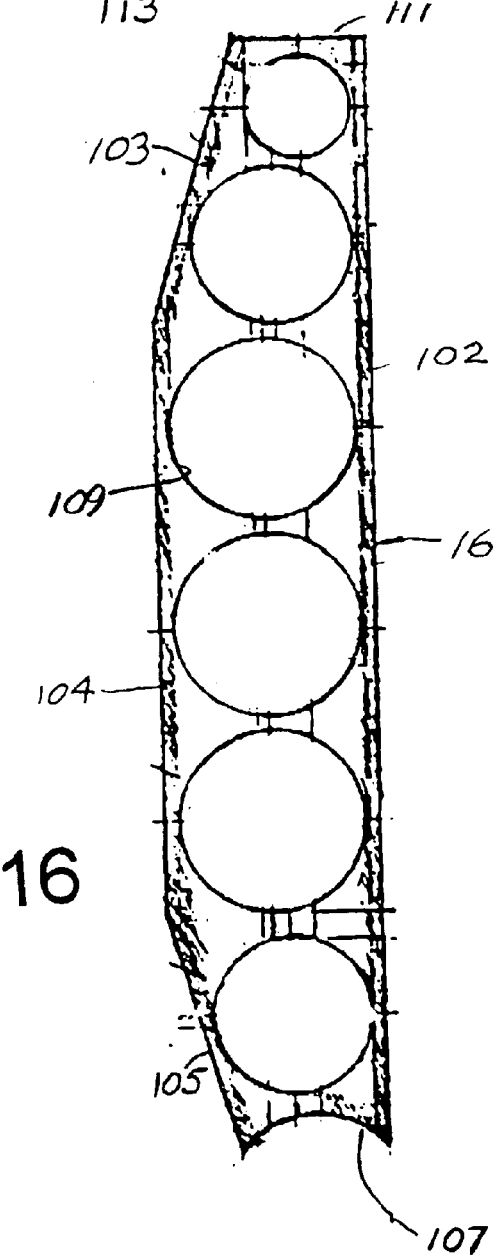
FIG. 16 is a cross-sectional side elevation of the strut base.
Figure 15:
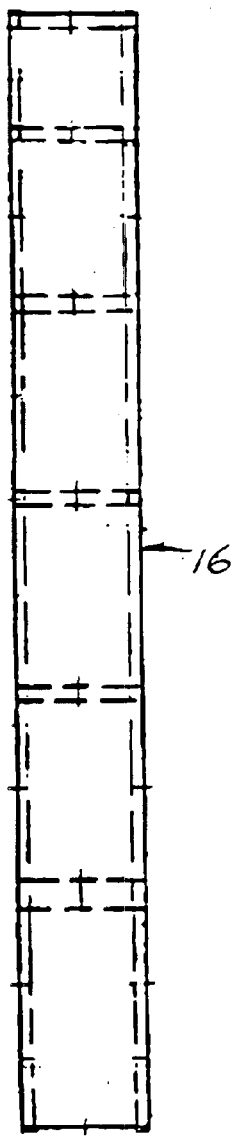
FIG. 15 is a rear elevation of the strut base.

As shown in FIGS. 14, 15 and 16, the strut base 16 has a generally rectangular shape 101 with trapezoidal upper and lower end sections 103, 105. Section 105 is radiused 107 to receive the welded bottom bracket. Through-holes 109 extend through the strut base 16 to lighten the strut base. The upper end 111 shows a central through-hole opening 113 to receive the lower end of the strut top.

FIGS. 17 and 18 are foreshortened views of the lower and upper ends of the strut top 14. The strut top has an inset lower end 115 which is machined to fit snugly in the through-hole opening 113 in the strut base. A portion of increased thickness 117 near the bottom of the tubular middle 119 absorbs stress. The upper end of the top strut 14 may be necked down in 121 to receive a seat tube clamp. A slot 123 with a rounded lower end 125 is formed in the upper end of the strut to permit inward movement to grip a seat tube.

The cylinder clamp 11 shown in FIGS. 19 and 20 is also referred to as the strut cylinder clamp. The strut cylinder clamp 11 has a generally cylindrical body 127 with an opening 129, which is closed as a bolt inserted through openings 131 is tightened. The bolt through the openings 131 tightens the clamp on the strut. The upper portion of the clamp adjustably connects the upper portion of the strut to position the strut with respect to the strut tube. In non-suspension forms the clamp clamps the strut to the strut tube for fixing the position of the lower bracket and creating the proper feeling of the bicycle to the rider. When used in the external suspension system, a bolt extending through holes 133 is used as a pin to connect the upper end of one or more shock absorbers to the clamp and thus to the strut. Clamping leverage is provided through the extension 135.

Figure 21:
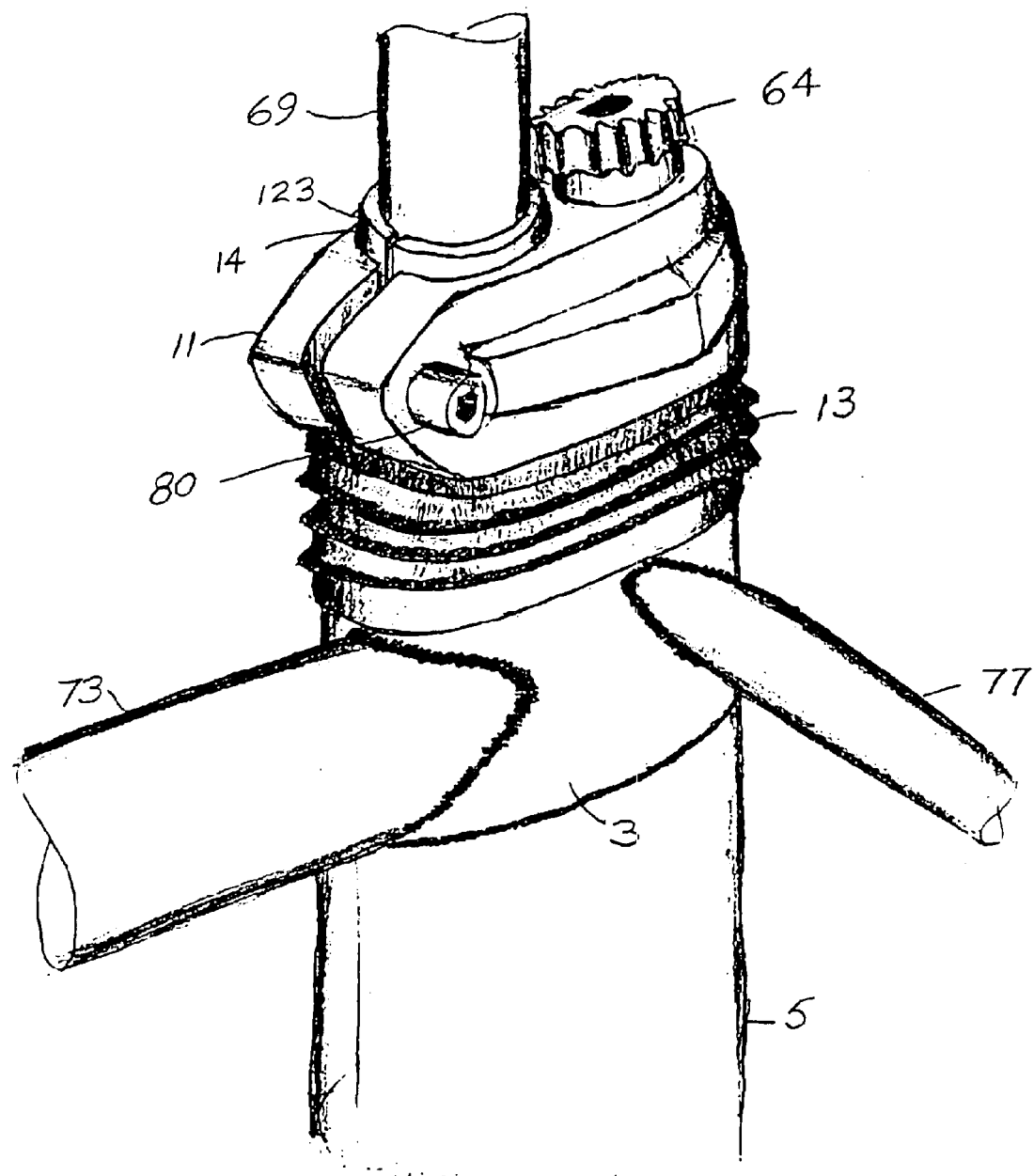
FIG. 21 is a perspective detail of a modular strut/frame showing a seat post, a strut and seat post clamp, an upper strut tube, spring adjuster and upper boot, a top strut guide and an upper portion of the strut tube and portions of a top tube and a seat stay.

FIG. 21 shows the upper end of strut tube 5 and a top strut guide 3. Upper tube 73 and seat stays 77 are connected to the top strut guide 3. Clamp 11 squeezes the top of strut 14 and narrows the gap 123, securing the seat post 69 in position in the strut top and securing the clamp on the strut top. Adjuster 64 adjusts the spring force on the spring which is inside of the top strut guide 3 and the strut tube 5.

Figure 22:
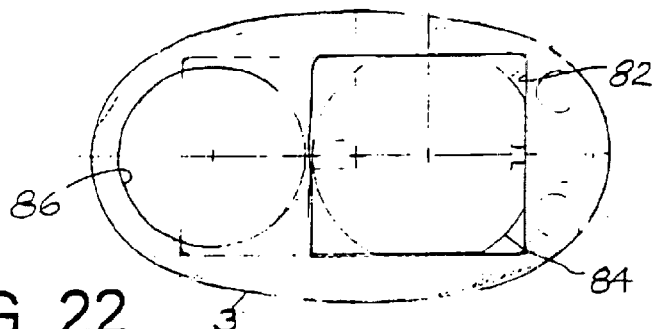
FIGS. 22 and 23 are a top view and a side cross sectional view of a strut tube, top guide and internal spring housing and a strut clamp cylinder mount shown in FIG. 21.

FIG. 22 shows the top of the top strut guide 3. A square opening 82 receives a rounded and flattened upper portion 84 of the strut 14. A large recess 86 in the top strut guide 3 holds a spring and damper assembly.

Figure 23:
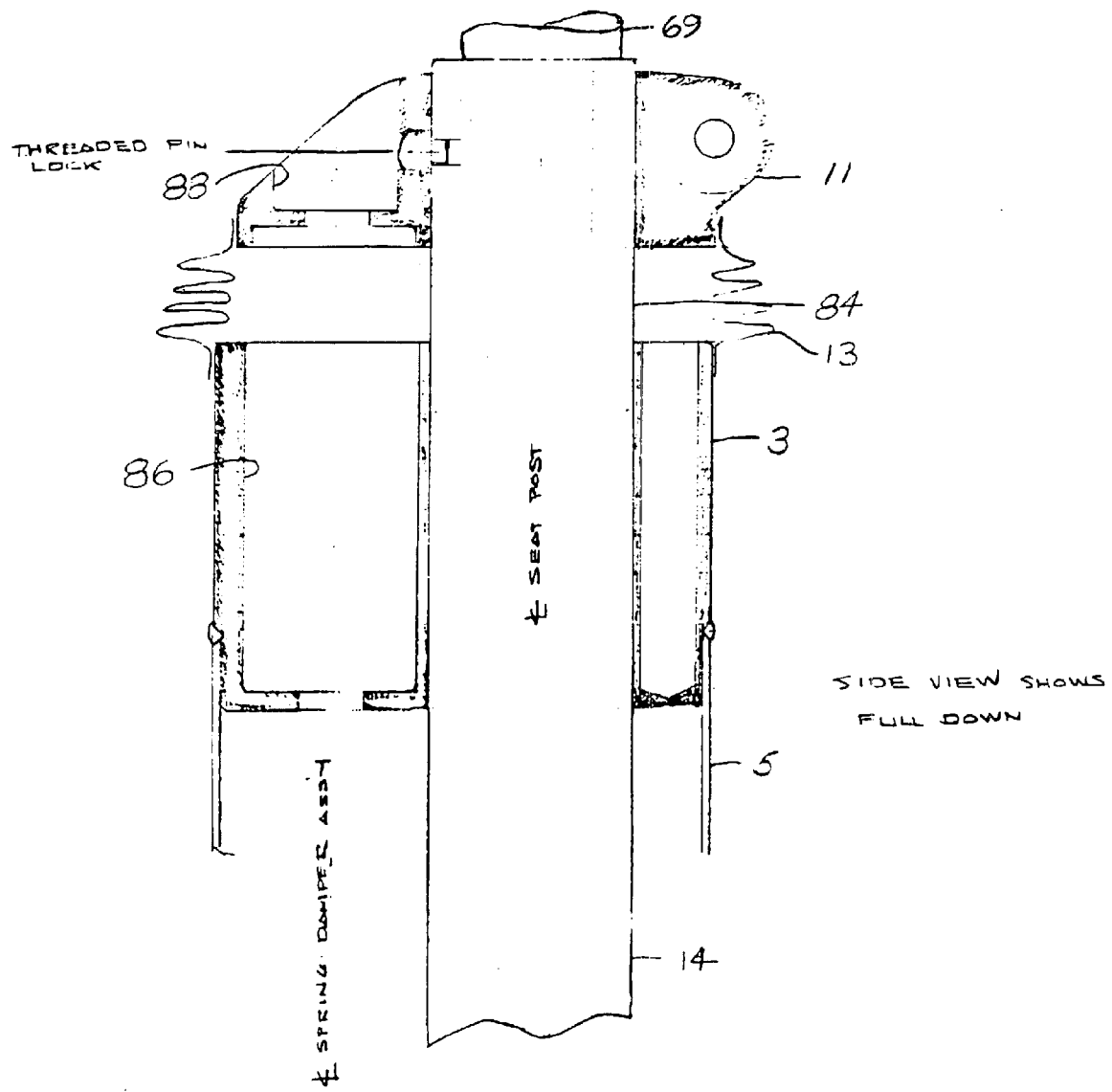

FIG. 23 shows the top of the strut tube 5 and the top strut guide 3 which surround the rounded and flattened upper portion 84 at the upper end of the strut 14. Upper boot 13 joins the clamp 11 and the top strut guide 3. Recess 88 on the upper side of the clamp receives the adjuster 64 shown in FIG. 21.

Figure 24:
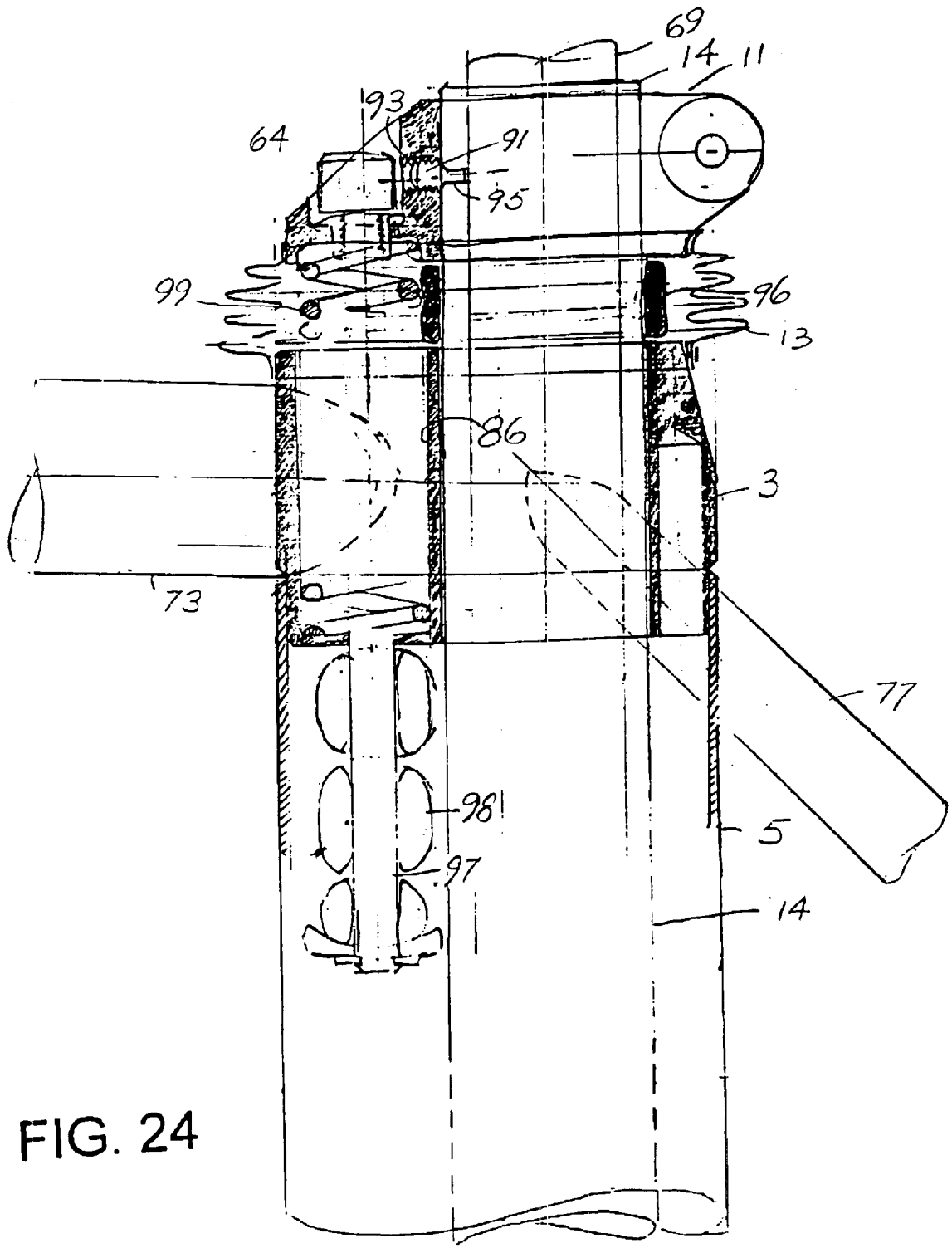
FIG. 24 is a side cross sectional view of the assembly of FIGS. 22 and 23 with the spring.

FIG. 24 is a view similar to that shown in FIG. 23. Two set screws 91 are inserted in threaded openings 93 within the recess 88 and extend into openings 95 in the upper end of the strut 14. A Viton compression ring 96 absorbs downward shock. Adjuster 64 is connected to the threaded upper end of rod 97 to adjust the force of the spring 99. Elastomeric annular springs 98 surrounding the exposed end of rod 97 provide rebound and bump stop adjustment.

Figure 25:
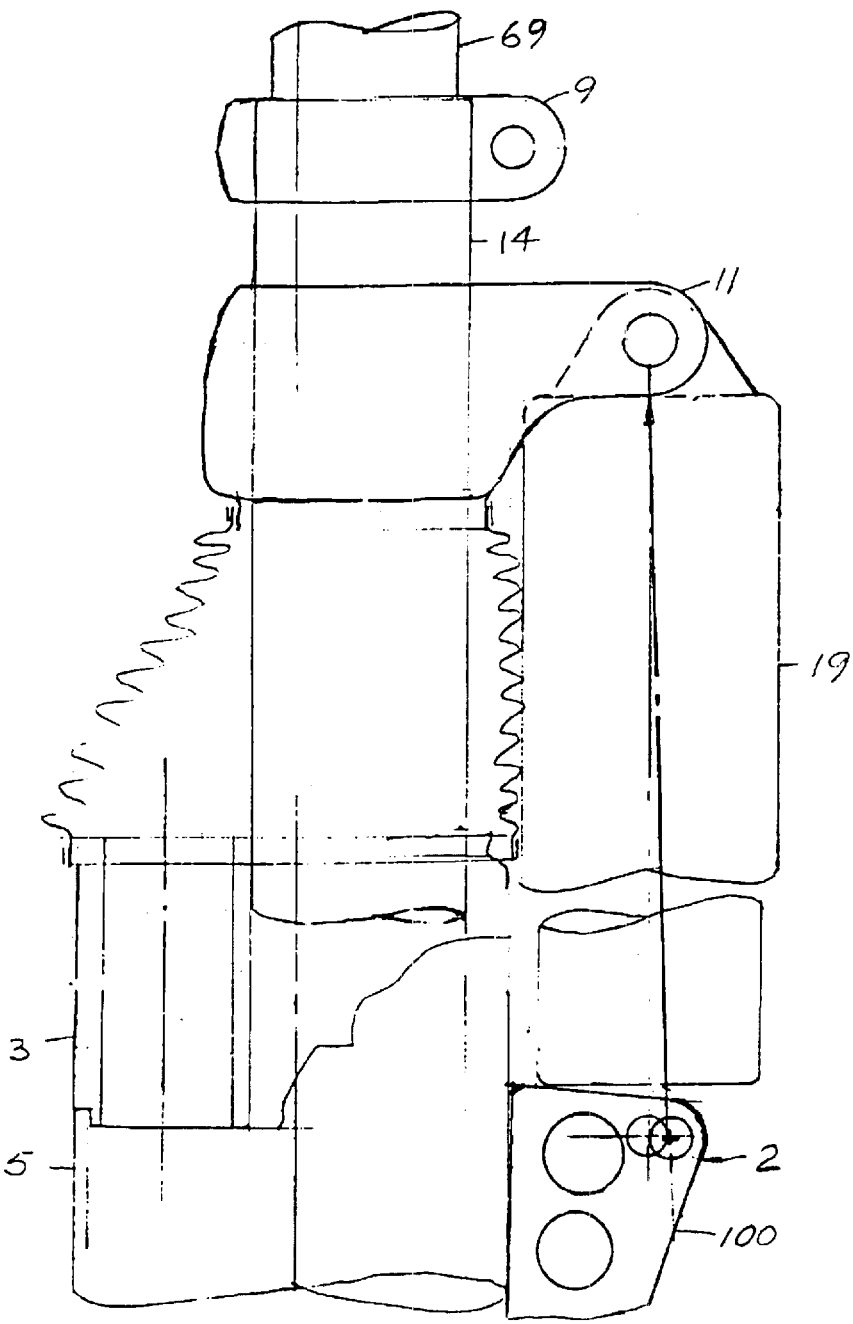
FIG. 25 is a side elevation view showing a top cylinder mount with a support.

FIG. 25 shows an embodiment of the invention with an outwardly mounted air cylinder 19 and a welded alternative triangular lower cylinder mount 100.

Unlike existing bicycle suspension devices, the present invention reduces shock to the rider and forces on the bicycle frame without causing any significant change in the basic frame geometry.

Figures 26, 27:
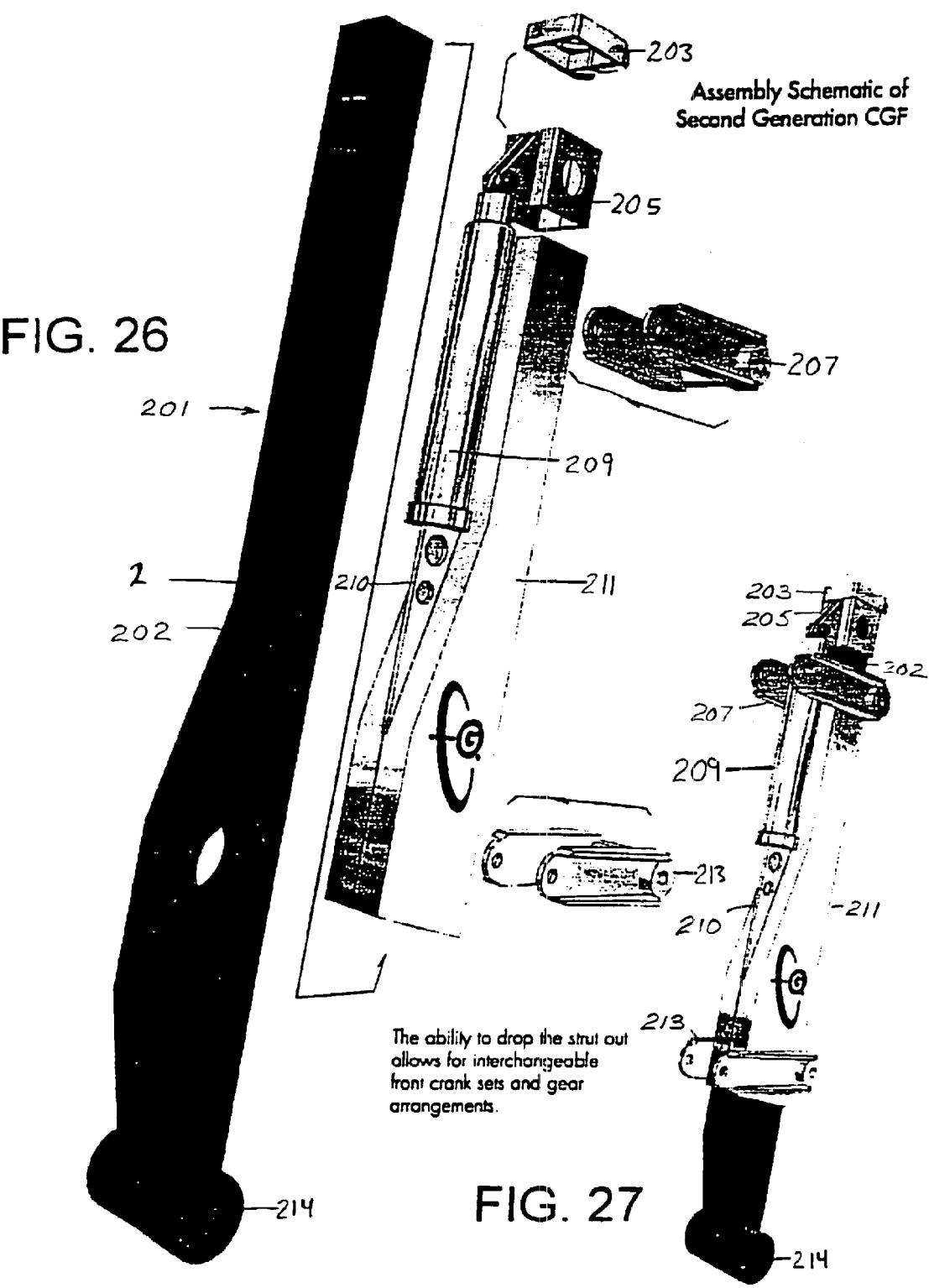
FIG. 26 shows the separate components of an alternate strut.
FIG. 27 shows an embodiment of the present invention shown FIG. 26 having the inner tube and the outer tube coupled by an air cylinder.

As shown in FIG. 26, an alternate assembly 201 has a main inner strut portion 202. A non-round outer tube 211 houses a close-fitting, complementary inner tube 202. A bicycle seat post is mounted by a clamping bracket 203 above a top end of a transition clamp tube 205 which connects the upper end of isolator 209 to the inner tube 202. The lower end of isolator 209 is connected by bracket 210 to the outer tube 211. A pedal crank axle housing 214 is mounted at a bottom end of the inner tube 202. Upper bracket 207 and lower bracket 213 are welded, or clamped to the outer tube 211 and provide mounting points for the remaining frame members depicted in FIGS. 28 and 29.

FIG. 27 shows the embodiment of the present invention in its fully assembled state. The ability to drop the inner tube 202 allows for interchangeable front crank sets and gear arrangements.

FIGS. 28 and 29 show the remaining members, including the chain stays 221, the rear stays 219, the top tube 215, and the down tube 217, of the bicycle frame connected directly to the upper bracket 207 and lower bracket 213. These mounting brackets 207 and 213 facilitate rapid assembly or replacement of components to suit manufacturing needs or riding conditions.

The outer tube 211 and the inner tube 202 are coupled such that movement of the seat and crank housing 214, and hence movement of the inner tube 202, are damped by isolator 209 from the rest of the frame. Thus, the seat and pedal crank axle housing 214 maintain the same spatial relationship and move as a unit, by movement of the inner tube 202 relative to the outer tube 211. Suspension of the major mass, the rider, seat and cranks is accomplished without significant frame and wheel stresses or distortions by interconnecting the seat and pedal crank housing 214 with a telescoping inner tube 202. FIG. 28 and 29 schematically illustrate how all critical angles and spatial relationships, including seat-to-pedal distances, remain unchanged when the new suspension is active between the full up and the full down positions. Hand to seat distances change, but it is normal to flex and extend arms with typical upper body movements.

Figure 30:
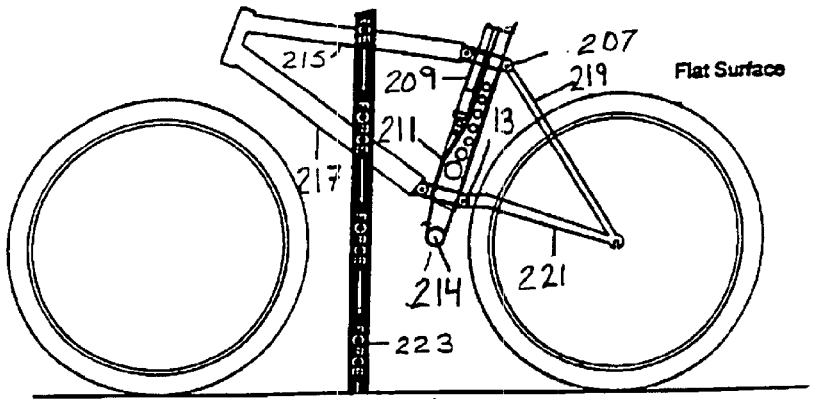
FIG. 30 shows an embodiment of the present invention and the effects of downward force on the strut when riding on a flat surface.
Figure 31:
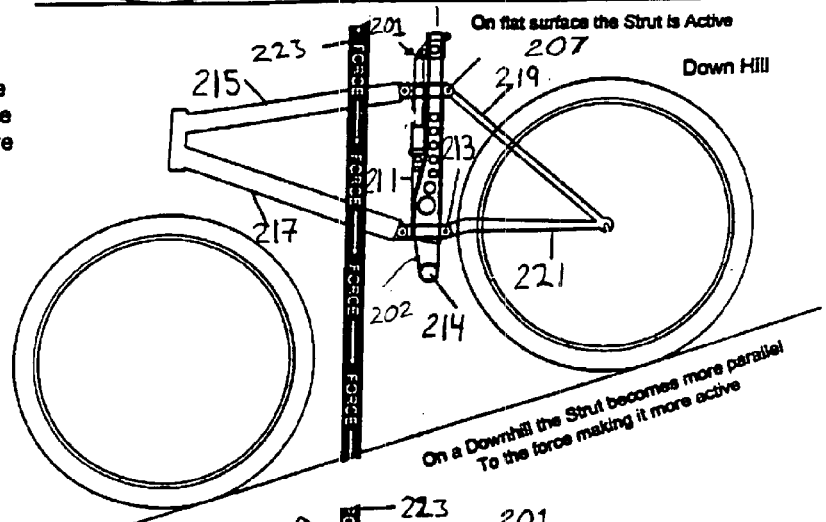
FIG. 31 shows an embodiment of the present invention and the effects of downward force on the strut when riding on a downhill surface.
Figure 32:
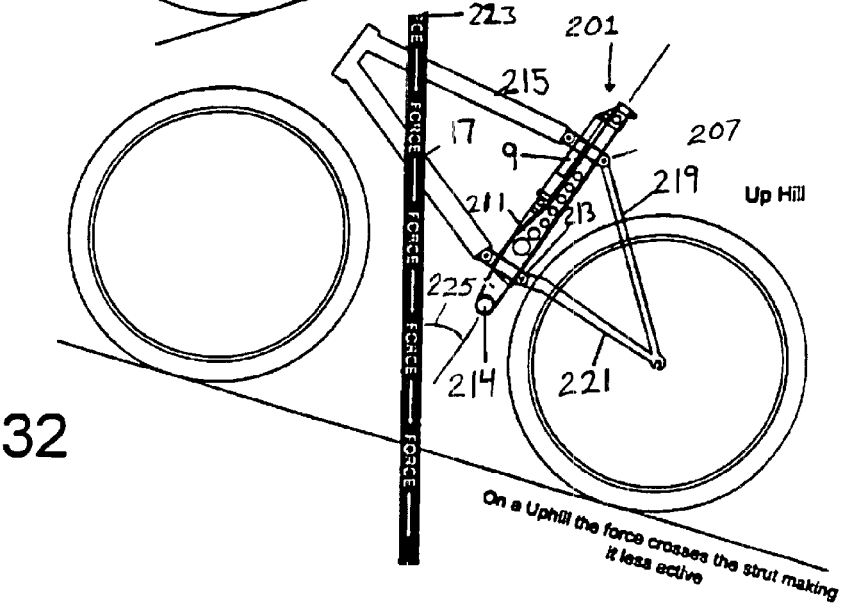
FIG. 32 shows an embodiment of the present invention and the effects of downward force on the strut when riding on an uphill surface.

FIGS. 30, 31, and 32 illustrate the effect of a downward force on the invention while positioned on level, downhill, and uphill surfaces, respectively. As the angle 225 between the invention 201 and the downward force 223 decreases, the amount of energy transferred to the invention 201 increases. This inverse relationship causes the invention 201 to be most active when riding downhill, least active when riding uphill, and moderately active when riding on a level surface, thus optimizing the utility of the invention. The preferred embodiment of the present invention demonstrates how changes in the static geometry of the bicycle frame, wheel position, seat, and pedal crank axle housing are maintained as energy is dissipated.

Figure 33:
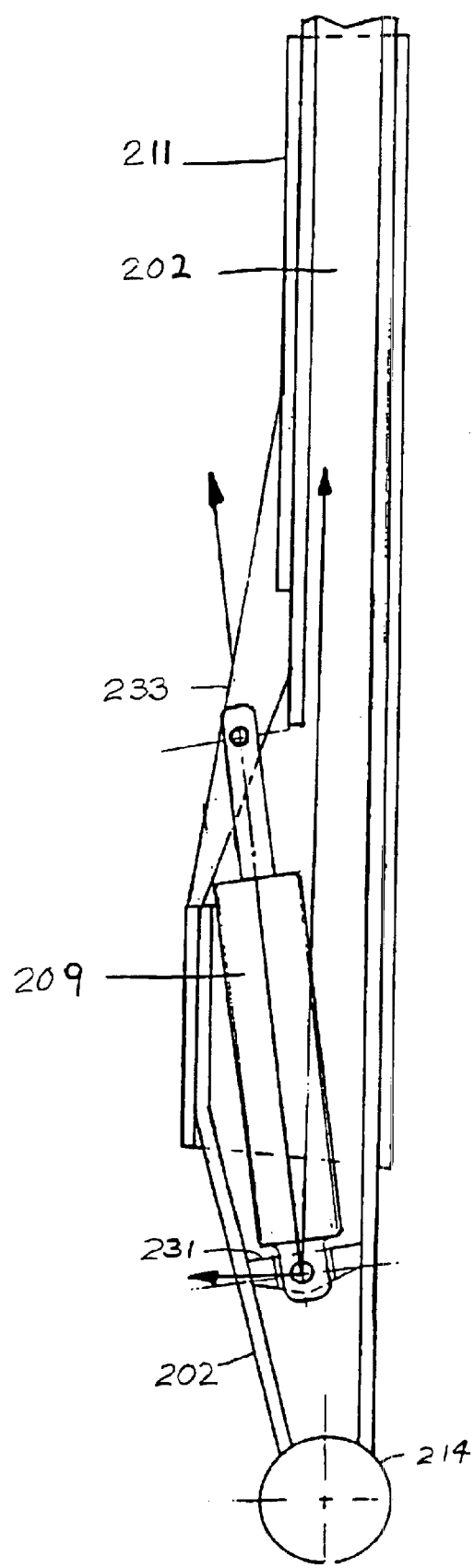
FIG. 33 shows an embodiment of the present invention with the isolator located inside the strut assembly.

FIG. 33 depicts an embodiment of the invention where the isolator 209 is located inside the inner tube 202 and outer tube 211. A mount 231 mounts the bottom of the isolator in the inner tube 202. A top mount 233 connects an upper end of the isolator to the outer tube 211. This arrangement makes the strut more compact, protects the isolator from road grit thrown up by the rear tire, lowers the center of gravity on the strut, and optimizes force directions acting on the strut. The isolator means shown is generic. A coil spring, elastomeric springs, or gas filled cylinder could be employed.

While the invention has been described with reference to specific embodiments, modifications and variations of the invention may be constructed without departing from the scope of the invention.

I claim:

1. Modular strut suspension apparatus for a bicycle comprising:
   a strut having upper and lower portions,
   a strut tube having a top and a bottom surrounding the strut,
   a top strut guide connected to the top of the strut tube,
   a base strut guide connected to the bottom of the strut tube,
   the upper portion of the strut being slidable in the top strut guide,
   the lower portion of the strut being slidable in the base strut guide, and
   a connector connected between the strut and one of the strut guides or the strut tube for controlling a position of the strut with respect to the strut tube,
   wherein the connector comprises a clamp connected to the strut, a lower mount connected to one of the strut guides or the strut tube and an extensible device connected between the clamp and the mount.

2. The apparatus of claim 1, wherein the clamp is connected near an upper end of the upper portion of the strut.

3. The apparatus of claim 2, wherein the extensible device further comprises a spring.

4. The apparatus of claim 3, wherein the spring comprises one or more gas cylinders.

5. The apparatus of claim 4, further comprising a valve connected to the one or more gas cylinders for adjusting gas pressure.

6. The apparatus of claim 1, further comprising an upper boot connected between the top strut guide and the connector.

7. Modular bicycle strut apparatus for a bicycle comprising:
   a strut having upper and lower portions,
   a bicycle tube assembly further comprising a strut tube having a top and a bottom,
   a top guide connected to the top of the tube,
   a base guide connected to the bottom of the tube, the top guide and the bottom guide extending across the tube and having openings for movably receiving the strut,
   the guides being configured for connecting bicycle frame parts to the guides,
   the upper portion of the strut being slidable in the top guide,
   the lower portion of the strut being slidable in the base guide, and
   a connector connected between the strut and one of the guides or the strut tube for controlling a position of the strut with respect to the strut tube,
   wherein the connector comprises a clamp connected to the strut, a mount connected to one of the guides or the strut tube and a compression device connected between the clamp and the mount.

8. The apparatus of claim 7, wherein the clamp is connected near an upper end of the upper portion of the strut.

9. The apparatus of claim 8, wherein the compression device further comprises a spring.

10. The apparatus of claim 9, wherein the spring comprises one or more gas cylinders.

11. The apparatus of claim 10, further comprising a valve connected to the one or more gas cylinders for adjusting gas pressure.

12. The apparatus of claim 7, further comprising an upper boot connected between the top guide and the connector.

* * * * *

UNITED STATES PATENT AND TRADEMARK OFFICE
CERTIFICATE OF CORRECTION

PATENT NO.     : 6,837,507 B1
DATED          : January 4, 2005
INVENTOR(S)    : H.P. McJunkin and Mark P. McJunkin It is certified that error appears in the above-identified patent and that said Letters Patent is hereby corrected as shown below:

Title page,
Item [76], Inventors, should read -- H.P. McJunkin, 401 Painted Spindle Ct., Wilmington, NC (US) 28405; Mark P. McJunkin, 1145 Zonolite Road, Suite 6, Atlanta, GA (US) 30306 --

Signed and Sealed this

Seventeenth Day of May, 2005

JON W. DUDAS
*Director of the United States Patent and Trademark Office*